United States Patent
Zhu et al.

(10) Patent No.: US 11,297,155 B2
(45) Date of Patent: Apr. 5, 2022

(54) BYPASS DELIVERY POLICY BASED ON THE USAGE (I/O OPERATION) OF CACHING MEMORY STORAGE IN CDN

(71) Applicant: Telefonaktiebolaget LM Ericsson (publ), Stockholm (SE)

(72) Inventors: Zhongwen Zhu, Saint-Laurent (CA); Igor Kushnirov, Montreal (CA); Adel Larabi, Pierrefonds (CA)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 16/962,619

(22) PCT Filed: Mar. 28, 2018

(86) PCT No.: PCT/IB2018/052148
§ 371 (c)(1),
(2) Date: Jul. 16, 2020

(87) PCT Pub. No.: WO2019/186237
PCT Pub. Date: Oct. 3, 2019

(65) Prior Publication Data
US 2020/0412828 A1    Dec. 31, 2020

(51) Int. Cl.
*G06F 15/167* (2006.01)
*H04L 67/568* (2022.01)
(Continued)

(52) U.S. Cl.
CPC ...... *H04L 67/2842* (2013.01); *H04L 67/1008* (2013.01); *H04L 67/1025* (2013.01); *H04L 67/2885* (2013.01); *H04L 67/327* (2013.01)

(58) Field of Classification Search
CPC ............. H04L 67/2842; H04L 67/1008; H04L 67/1025; H04L 67/2885; H04L 67/327
See application file for complete search history.

(56) References Cited

U.S. PATENT DOCUMENTS

| 2007/0118667 A1 | 5/2007 | McCarthy et al. |
| 2008/0028081 A1* | 1/2008 | Bruss ...................... H04L 63/08 709/228 |

(Continued)

FOREIGN PATENT DOCUMENTS

| WO | 2016055893 A1 | 4/2016 |
| WO | 2017149355 A1 | 9/2017 |

OTHER PUBLICATIONS

PCT International Search Report and Written Opinion dated Dec. 7, 2018 for International Application PCT/IB2018/052148, 12 pages.

*Primary Examiner* — Ryan J Jakovac
(74) *Attorney, Agent, or Firm* — Sage Patent Group

(57) ABSTRACT

A request router is disclosed for a multi-tier Content Delivery Network (CDN), each tier corresponding to a hierarchical layer of the CDN. The request router includes processing circuitry configured to: receive, from a first delivery node of a hierarchical layer of the CDN, a routing request to bypass the first delivery node for content delivery to a user equipment; and as a result of receiving the routing request to bypass the first delivery node for the content delivery to the user equipment, select at least a second delivery node for the content delivery to the user equipment.

16 Claims, 11 Drawing Sheets

(51) Int. Cl.
*H04L 67/1008* (2022.01)
*H04L 67/1025* (2022.01)
*H04L 67/2885* (2022.01)
*H04L 67/63* (2022.01)

(56) References Cited

U.S. PATENT DOCUMENTS

| | | | |
|---|---|---|---|
| 2011/0231475 A1* | 9/2011 | Van der Merwe | ........................... |
| | | | H04L 67/1002 |
| | | | 709/203 |
| 2013/0179541 A1* | 7/2013 | Chen | ..................... H04L 65/608 |
| | | | 709/219 |
| 2015/0358401 A1 | 12/2015 | Flavel et al. | |
| 2016/0127480 A1* | 5/2016 | Rose | ..................... H04L 61/103 |
| | | | 709/219 |
| 2018/0077258 A1* | 3/2018 | Newton | .............. H04L 67/2842 |
| 2019/0212995 A1* | 7/2019 | Hwang | .................. G06F 11/30 |

* cited by examiner

BYPASS DELIVERY POLICY BASED ON THE USAGE (I/O OPERATION) OF CACHING MEMORY STORAGE IN CDN

CROSS-REFERENCE TO RELATED APPLICATIONS

This application is a 35 U.S.C. § 371 national stage application for International Application No. PCT/IB2018/052148, entitled "BYPASS DELIVERY POLICY BASED ON THE USAGE (I/O OPERATON) OF CACHING MEMORY STORAGE IN CDN," filed on Mar. 28, 2018, the disclosure and contents of which are hereby incorporated by reference in their entireties.

TECHNICAL FIELD

The present disclosure relates to content delivery networks and, in particular, to methods and apparatuses for a bypass delivery policy based on at least a usage (e.g., I/O operations) of caching memory storage.

BACKGROUND

In order to enhance user experience, a content provider (CP) can provide its content to a content delivery network (CDN) for distribution to end-user client devices. Content providers may store content at an origin server, where the CP manages its own content. Generally, it is desirable to limit attempts to access the origin server, which may have a limited capacity to respond to client requests. Thus, an interface address of the origin server may be provided to the CDN for caching and distributing content on the origin server to end-user client devices. The CDN can cache the content in one or more delivery nodes (DNs), which many also be considered delivery caching nodes.

The DNs may be geographically dispersed. A CDN operator can deliver the content to end-user client devices using a selected delivery node that is configured to obtain content from the origin server when the content is requested. Typically, the selected DN is located relatively closely to a requesting end-user client device. The DNs may also be organized as a hierarchy, such as a multi-tier CDN, where each "tier" of the CDN may correspond to a hierarchical layer of the CDN.

A request router (RR) may be configured to provide a request routing service (RRS), which may be responsible for routing traffic from end-user client devices to edge delivery nodes, between tiers, and from a core delivery node to origin servers. A monitoring service (MS) may be in communication with the RR and the MS may be responsible for collecting Key Performance Indexes (KPIs) from all the DNs in the CDN, consolidating the KPIs and sending them to the RRS. RRS may make a routing decision based on the information from MS.

In CDN, the delivery node may be considered a key element that caches the content locally (e.g., in cache memory storage on DN) and then may deliver the content to the end-user client devices requesting such content nearby. In order to cache content locally, each delivery node requires the storage in memory (e.g., random access memory (RAM), solid state drive (SSD), or hard disk drive (HDD)). Two storage-oriented operations (READ and WRITE) can be crucial to the performance of the delivery node. In particular, a READ operation may play a key role when a delivery node serves the cached content to a client device, while WRITE operation may play a key role when a delivery node caches the response from the origin server. Both READ and WRITE operations to storage memory are a bottle neck in the performance of the delivery node.

In order to enhance user experience in the client device, latency for delivering the requested content should be kept to a minimum. The bottle necks for content delivery latency are network, delivery node, and origin server. The present disclosure is primarily concerned with content delivery latency in the delivery node. As shown in FIG. 1, within the delivery node, there are generally two cases associated with caching content—one is referred to as a cache HIT, and the other is referred to as a cache MISS.

With reference to FIG. 1, for a cache MISS mode, content has been requested by a client device (step 1) but the requested content has not been cached locally in the DN. Therefore, the DN sends the request to an upstream-tier DN or to the origin server (step 2a) to fetch the content. When the corresponding response (e.g., content) is received from the upstream-tier DN or the origin server (step 3a), the DN caches the content in local storage (step 4a) (i.e., performs a WRITE operation to write content to local storage). Typically, at the same time as the caching is performed as in step 4a, the DN proxies the response to the client device (step 4b). In step 4a, the WRITE operation requires computational resources to perform the caching. If there are numerous content writing operations into storage being performed at the same time, the processing load on the processor (e.g., central processing unit (CPU)) of the DN can increase significantly in a short time period, which may block other ongoing process that handle incoming client request. This leads to high latency in the DN delivering the content to the client device. In addition, the writing operations can slow down and result in other responses from the origin server being placed in a queue, waiting for a writing operation instead of being cached right away.

Still referring to FIG. 1, for a cache HIT mode, content has been requested by a client device (step 1) and (unlike the cache MISS mode) the requested content has already been cached in DN storage. Based on the request Universal Resource Locator (URL), DN can locate the content from its storage by performing a READ operation (step 2b) and serve the read content to the client device (step 3b). In step 2b, DN is required to locate the content in the storage and retrieve the content from storage to serve to the client device. It is not uncommon for DN to receive multiple client requests at the same time, each client request requesting different content. This can lead to multiple READ operations towards the storage, which can require a large amount of computational resources (i.e., increases the CPU load). Multiple simultaneous READ operations may also slow down the DN's processing ability to handle ongoing client request. This can increase the latency for serving the responses to requesting client devices.

Thus, when the number of READ and/or WRITE operations increases, it can lead to high latency in DN to deliver the content to the client device. Such performance deterioration could eventually degrade the DN if there is not an I/O protection scheme in place.

Known I/O protection schemes are available to mitigate CPU usage and latency issues in cases where READ and WRITE operations increase significantly in a short time period. One example of I/O protection is shown in FIG. 2. The basic concept of this I/O protection example is to introduce a "bypass" scenario when DN enters an I/O protection mode. In bypass mode, the DN permits the client request to bypass the DN without incurring a processing load on the DN. For example, when the DN is in bypass mode, the DN may proxy the client request to an upstream-tier/higher-tier DN or the origin server, instead of reading the content from or writing the content to cache. In other words, at least steps 4*a* and 2*b* from FIG. 2 can be eliminated when the DN is in the I/O protection mode. Accordingly, in bypass mode, no storage operation may be performed when bypassing the client request. This can reduce the processing load in the DN. A bypass ratio may be used to control the ratio between the DN bypassing incoming client requests (I/O protection mode) and the DN caching content delivery (normal mode). In order to avoid switching from "bypass" mode to "normal" mode frequently, high and low mark may be used to activate or de-activate I/O protection. When the latency (due to high READ and/or WRITE operations) exceeds the given high mark, DN may trigger I/O protection and begin to permit the client requests to "bypass" according to the bypass ratio. Due to the "bypass" operation, the processing load on the DN can be reduced. This may improve the time required to handle the client request and may improve the latency. When the latency reduces under the given low mark, the DN may switch back to normal caching proxy mode. Referring to FIG. 1, the flow for bypassing the DN can be seen as beginning with step 1, proceeding sequentially to steps 2*a* and 3*a*, and then to step 4*b*, where the response is served to the end-user requesting client device. The latency may be measured by the DN at a predetermined time interval, e.g. every second, and averaged based on the collected samples. One example of the latency measurement that can be performed by the DN to switch between normal and bypass modes is shown in FIG. 2, where:

For READ operation, r_await value from "iostat" is used. The average of several consecutive samples is used, e.g., 3 samples.

For WRITE operation, w_await value from "iostat" is used. The average of several consecutive samples is used, e.g., 3 samples.

Unfortunately, this solution focuses primarily on each delivery node, which is not efficient for the CDN as a whole. In addition, allowing the DN to independently bypass client requests client requests according to this solution can result in an unacceptable increase in burden on the higher level tiers and on origin servers, which is undesirable from a macro perspective.

SUMMARY

Some embodiments advantageously provide a method and system for utilizing a request router to identify a DN candidate to handle a bypass client request instead of permitting the client requests to bypass the local DN to obtain content from the origin server or a higher layer of the CDN. Thus, overloading the origin servers and higher layer DNs due to bypass modes of edge DNs can be reduced and latency in the edge layer DNs due to READ and WRITE operations can be minimized.

According to one aspect of the disclosure, a request router for a multi-tier Content Delivery Network (CDN) is provided, each tier corresponding to a hierarchical layer of the CDN. The request router includes processing circuitry configured to receive, from a first delivery node of a hierarchical layer of the CDN, a routing request to bypass the first delivery node for content delivery to a user equipment; and as a result of receiving the routing request to bypass the first delivery node for the content delivery to the user equipment, select at least a second delivery node for the content delivery to the user equipment.

According to this aspect of the disclosure, in some embodiments, the processing circuitry is configured to select the at least the second delivery node for the content delivery to the user equipment by being further configured to select the at least the second delivery node for the content delivery to the user equipment from at least a same hierarchical layer of the CDN as the hierarchical layer of the first delivery node. In some embodiments of this aspect of the disclosure, the processing circuitry is configured to select the at least the second delivery node for the content delivery to the user equipment by being further configured to select the at least the second delivery node for the content delivery to the user equipment from one of a same hierarchical layer of the CDN as the hierarchical layer of the first delivery node and a higher hierarchical layer than the hierarchical layer of the first delivery node, the selection being dependent on at least a number of delivery nodes in the CDN that are determined to be in a bypass mode. In some embodiments of this aspect of the disclosure, the hierarchical layer of the CDN is an edge layer of the CDN and the higher hierarchical layer is one of a region layer and a core layer of the CDN. In some embodiments of this aspect of the disclosure, the processing circuitry is further configured to select the at least the second delivery node for the content delivery to the user equipment by being further configured to: select the at least the second delivery node from a same hierarchical layer of the CDN as the hierarchical layer of the first delivery node unless a number of delivery nodes that are determined to be in a bypass mode at least meets a threshold number of delivery nodes; and if the number of delivery nodes that are in the bypass mode at least meets the threshold number of delivery nodes, select the at least the second delivery node from one of an origin server and a delivery node in a higher hierarchical layer of the CDN than the hierarchical layer of the first delivery node. In some embodiments of this aspect, the processing circuitry is further configured to, if the selected at least the second delivery node is in a same hierarchical layer of the CDN as the hierarchical layer of the first delivery node, communicate, to the first delivery node, an indication to redirect a content delivery request from the user equipment to the at least the second delivery node in the same hierarchical layer of the CDN. In some embodiments of this aspect, the indication to redirect the content delivery request includes at least an address of the at least the second delivery node to which the user equipment is to be redirected. In some embodiments of this aspect, the processing circuitry is further configured to, if the selected at least the second delivery node is not in a same hierarchical layer of the CDN as the hierarchical layer of the first delivery node, communicate, to the first delivery node, an indication to, instead of accessing local cache, proxy a content delivery request for one of an origin server and a delivery node in a higher hierarchical layer of the CDN than the hierarchical layer of the first delivery node. In some embodiments of this aspect, the indication to proxy the content delivery request includes an indication to proxy the content request using Hypertext Transfer Protocol. In some embodiments of this aspect, for adaptive bit rate, ABR, content requests, only manifest requests are permitted to bypass the first delivery node for the selected at least the second delivery node. In some embodiments of this aspect, for ABR content requests, segment file requests are not permitted to bypass the first delivery node for the selected at least the second delivery node. In some embodiments of this aspect, the processing circuitry is configured to receive, from the first delivery node, the routing request to bypass the first delivery node by receiving the routing request comprising at least a bypass ratio and an Internet Protocol, IP, address of the user equipment. In some embodiments of this aspect, the bypass ratio is a ratio of a number of content delivery requests that should bypass the first delivery node to a total number of content delivery requests assigned to the first delivery node. In some embodiments of this aspect, the bypass ratio is determined based on at least a processing load of the first delivery node. In some embodiments of this aspect, the processing circuitry is further configured to select the at least the second delivery node based on at least a bypass ratio and an Internet Protocol, IP, address of the user equipment. In some embodiments of this aspect, the processing circuitry is further configured to select the at least the second delivery node based on at least a key performance indicator of the at least the second delivery node. In some embodiments of this aspect, the processing circuitry is further configured to: determine a number of delivery nodes that are in a bypass mode; and as a result of determining that the number of delivery nodes that are in the bypass mode at least meets a threshold, communicate, to a Monitoring Service, an indication that current traffic volume at least meets a threshold capacity of the CDN. In some embodiments, the processing circuitry is further configured to: determine whether to proxy a content delivery request to the at least the second delivery node in a higher hierarchical layer of the CDN than the hierarchical layer of the first delivery node; and if the content delivery request is determined to be proxied to the at least the second delivery node in the higher hierarchical layer of the CDN, one of: statically determine a routing path between the first delivery node in the hierarchical layer and the at least the second delivery node in the higher hierarchical layer; and dynamically determine, via a hashing algorithm (e.g., rendez-vous hashing, consistent hashing, or other algorithm, etc., such as another content based request routing), a routing path between the first delivery node in the hierarchical layer and the at least the second delivery node (14b, 14c) in the higher hierarchical layer.

According to another aspect of the present disclosure, a first delivery node of a multi-tier Content Delivery Network (CDN) is provided, each tier corresponding to a hierarchical layer of the CDN. The first delivery node includes processing circuitry configured to: communicate, to a request router, a routing request to bypass the first delivery node for content delivery to a user equipment, the first delivery node being in a hierarchical layer of the CDN; and receive an indication of at least a second delivery node for the content delivery to the user equipment, as a result of the routing request to bypass the first delivery node.

According to this aspect of the present disclosure, in some embodiments, the at least the second delivery node is in a same hierarchical layer of the CDN as the hierarchical layer of the first delivery node. In some embodiments of this aspect, the at least the second delivery node is in one of a same hierarchical layer of the CDN as the hierarchical layer of the first delivery node and a higher hierarchical layer than the hierarchical layer of the first delivery node depending on at least a number of delivery nodes in the CDN that are determined to be in a bypass mode. In some embodiments of this aspect, the processing circuitry is further configured to: receive a content delivery request from the user equipment; determine whether the content delivery request is an adaptive bit rate, ABR, content delivery request; and if the content delivery request is an ABR content delivery request, determine whether the ABR content delivery request is one of a manifest request and a segment file request. In some embodiments of this aspect, the processing circuitry is further configured to: if the ABR content delivery request is the manifest request: communicate, to the request router, the routing request to bypass the first delivery node for the content delivery to the user equipment. In some embodiments of this aspect, the processing circuitry is further configured to: if the ABR content delivery request is the segment file request: deliver, to the user equipment, a segment file corresponding to the segment file request, instead of communicating the routing request to the request router to bypass the first delivery node. In some embodiments of this aspect, the processing circuitry is configured to communicate, to the request router, the routing request to bypass the first delivery node by communicating the routing request comprising at least a bypass ratio and an Internet Protocol, IP, address of the user equipment. In some embodiments of this aspect, the processing circuitry is further configured to determine the bypass ratio based on at least a processing load of the first delivery node. In some embodiments of this aspect, the hierarchical layer of the first delivery node and the second delivery node is an edge layer of the CDN. In some embodiments of this aspect, the processing circuitry is further configured to communicate the indication of the at least the second delivery node to the user equipment, the indication being an address of the at least the second delivery node. In some embodiments of this aspect, the processing circuitry is configured to receive the indication of the at least the second delivery node for the content delivery to the user equipment, as the result of the routing request to bypass the first delivery node, by being further configured to receive at least one of: an indication to redirect a content delivery request from the user equipment to the at least the second delivery node in the same hierarchical layer of the CDN; and an indication to proxy a content delivery request for one of an origin server and a delivery node in a higher hierarchical layer of the CDN than the hierarchical layer of the first delivery node. In some embodiments of this aspect, the processing circuitry is further configured to: as a result of the received indication to redirect the content delivery request, communicate an address of the at least the second delivery node to the user equipment; and as a result of the received indication to proxy the content delivery request, receive content from the one of the origin server and the delivery node in the higher hierarchical layer of the CDN and forward the content to the user equipment, without accessing local cache. In some embodiments, the processing circuitry is further configured to: if the indication of the at least the second delivery node indicates that the content delivery to the user equipment is to be proxied to the at least the second delivery node in a higher hierarchical layer of the CDN than the hierarchical layer of the first delivery node one of: obtain a statically determined routing path between the first delivery node in the hierarchical layer and the at least the second delivery node in the higher hierarchical layer; and obtain a dynamically determined routing path between the first delivery node in the hierarchical layer and the at least the second delivery node in the higher hierarchical layer.

According to yet another aspect of the present disclosure, a method for a request router for a multi-tier Content Delivery Network (CDN) is provided, each tier corresponding to a hierarchical layer of the CDN. The method includes receiving, from a first delivery node of a hierarchical layer of the CDN, a routing request to bypass the first delivery node for content delivery to a user equipment; and as a result of receiving the routing request to bypass the first delivery node for the content delivery to the user equipment, selecting at least a second delivery node for the content delivery to the user equipment.

According to this aspect of the disclosure, in some embodiments, selecting the at least the second delivery node for the content delivery to the user equipment further comprises selecting the at least the second delivery node for the content delivery to the user equipment from at least a same hierarchical layer of the CDN as the hierarchical layer of the first delivery node. In some embodiments of this aspect, selecting the at least the second delivery node for the content delivery to the user equipment further comprises selecting the at least the second delivery node for the content delivery to the user equipment from one of a same hierarchical layer of the CDN as the hierarchical layer of the first delivery node and a higher hierarchical layer than the hierarchical layer of the first delivery node, the selection being dependent on at least a number of delivery nodes in the CDN that are determined to be in a bypass mode. In some embodiments of this aspect, the hierarchical layer of the CDN is an edge layer of the CDN and the higher hierarchical layer is one of a region layer and a core layer of the CDN. In some embodiments of this aspect, selecting the at least the second delivery node for the content delivery to the user equipment further comprises: selecting the at least the second delivery node from a same hierarchical layer of the CDN as the hierarchical layer of the first delivery node unless a number of delivery nodes that are determined to be in a bypass mode at least meets a threshold number of delivery nodes; and if the number of delivery nodes that are in the bypass mode at least meets the threshold number of delivery nodes, selecting the at least the second delivery node from one of an origin server and a delivery node in a higher hierarchical layer of the CDN than the hierarchical layer of the first delivery node. In some embodiments of this aspect, the method may further include, if the selected at least the second delivery node is in a same hierarchical layer of the CDN as the hierarchical layer of the first delivery node, communicating, to the first delivery node, an indication to redirect a content delivery request from the user equipment to the at least the second delivery node in the same hierarchical layer of the CDN. In some embodiments of this aspect, the indication to redirect the content delivery request includes at least an address of the at least the second delivery node to which the user equipment is to be redirected. In some embodiments of this aspect, the method may further include, if the selected at least the second delivery node is not in a same hierarchical layer of the CDN as the hierarchical layer of the first delivery node, communicate, to the first delivery node, an indication to, instead of accessing local cache, proxy a content delivery request for one of an origin server and a delivery node in a higher hierarchical layer of the CDN than the hierarchical layer of the first delivery node. In some embodiments of this aspect, the indication to proxy the content delivery request includes an indication to proxy the content request using Hypertext Transfer Protocol. In some embodiments of this aspect, for adaptive bit rate, ABR, content requests, only manifest requests are permitted to bypass the first delivery node for the selected at least the second delivery node. In some embodiments of this aspect, for ABR content requests, segment file requests are not permitted to bypass the first delivery node for the selected at least the second delivery node. In some embodiments of this aspect, wherein receiving, from the first delivery node, the routing request to bypass the first delivery node further includes receiving the routing request comprising at least a bypass ratio and an Internet Protocol, IP, address of the user equipment. In some embodiments of this aspect, the bypass ratio is a ratio of a number of content delivery requests that should bypass the first delivery node to a total number of content delivery requests assigned to the first delivery node. In some embodiments of this aspect, the bypass ratio is determined based on at least a processing load of the first delivery node. In some embodiments of this aspect, selecting the at least the second delivery node further includes selecting the at least the second delivery node based on at least a bypass ratio and an IP address of the user equipment. In some embodiments of this aspect, selecting the at least the second delivery node further includes selecting the at least the second delivery node based on at least a key performance indicator of the at least the second delivery node. In some embodiments of this aspect, the method further includes determining a number of delivery nodes that are in a bypass mode; and as a result of determining that the number of delivery nodes that are in the bypass mode at least meets a threshold, communicating, to a Monitoring Service, an indication that current traffic volume at least meets a threshold capacity of the CDN. In some embodiments, the method further includes determining whether to proxy a content delivery request to the at least the second delivery node in a higher hierarchical layer of the CDN than the hierarchical layer of the first delivery node; and, if the content delivery request is determined to be proxied to the at least the second delivery node in the higher hierarchical layer of the CDN, one of: statically determining a routing path between the first delivery node in the hierarchical layer and the at least the second delivery node in the higher hierarchical layer; and dynamically determining, via a hashing algorithm, a routing path between the first delivery node in the hierarchical layer and the at least the second delivery node in the higher hierarchical layer.

According to yet another aspect of the present disclosure, a method for a first delivery node of a multi-tier Content Delivery Network (CDN) is provided, each tier corresponding to a hierarchical layer of the CDN. The method includes communicating, to a request router, a routing request to bypass the first delivery node for content delivery to a user equipment, the first delivery node being in a hierarchical layer of the CDN; and receiving an indication of at least a second delivery node for the content delivery to the user equipment, as a result of the routing request to bypass the first delivery node.

According to this aspect of the disclosure, in some embodiments, the at least the second delivery node is in a same hierarchical layer of the CDN as the hierarchical layer of the first delivery node. In some embodiments of this aspect, the at least the second delivery node is in one of a same hierarchical layer of the CDN as the hierarchical layer of the first delivery node and a higher hierarchical layer than the hierarchical layer of the first delivery node depending on at least a number of delivery nodes in the CDN that are determined to be in a bypass mode. In some embodiments of this aspect, the method further includes receiving a content delivery request from the user equipment; determining whether the content delivery request is an adaptive bit rate, ABR, content delivery request; and if the content delivery request is an ABR content delivery request, determining whether the ABR content delivery request is one of a manifest request and a segment file request. In some embodiments of this aspect, the method further includes, if the ABR content delivery request is the manifest request: communicating, to the request router, the routing request to bypass the first delivery node for the content delivery to the user equipment. In some embodiments of this aspect, the method further includes, if the ABR content delivery request is the segment file request: delivering, to the user equipment, a segment file corresponding to the segment file request, instead communicating the routing request to bypass the first delivery node. In some embodiments of this aspect, communicating, to the request router, the routing request to bypass the first delivery node further includes communicating the routing request comprising at least a bypass ratio and an Internet Protocol, IP, address of the user equipment. In some embodiments of this aspect, the method further includes determining the bypass ratio based on at least a processing load of the first delivery node. In some embodiments of this aspect, the hierarchical layer of the first delivery node and the second delivery node is an edge layer of the CDN. In some embodiments of this aspect, the method further includes communicating the indication of the at least the second delivery node to the user equipment, the indication being an address of the at least the second delivery node. In some embodiments of this aspect, receiving the indication of the at least the second delivery node for the content delivery to the user equipment, as the result of the routing request to bypass the first delivery node further comprises receiving at least one of: an indication to redirect a content delivery request from the user equipment to the at least the second delivery node in the same hierarchical layer of the CDN; and an indication to proxy a content delivery request for one of an origin server and a delivery node in a higher hierarchical layer of the CDN than the hierarchical layer of the first delivery node. In some embodiments of this aspect, the method further includes at least one of: as a result of the received indication to redirect the content delivery request, communicating an address of the at least the second delivery node to the user equipment; and as a result of the received indication to proxy the content delivery request, receiving content from the one of the origin server and the delivery node in the higher hierarchical layer of the CDN and forward the content to the user equipment, without accessing local cache. In some embodiments, the method further includes, if the indication of the at least the second delivery node indicates that the content delivery to the user equipment is to be proxied to the at least the second delivery node in a higher hierarchical layer of the CDN than the hierarchical layer of the first delivery node, one of: obtaining a statically determined routing path between the first delivery node in the hierarchical layer and the at least the second delivery node in the higher hierarchical layer; and obtaining a dynamically determined routing path between the first delivery node in the hierarchical layer and the at least the second delivery node in the higher hierarchical layer.

According to an alternative aspect of the disclosure, a request router for a multi-tier Content Delivery Network (CDN) is provided, each tier corresponding to a hierarchical layer of the CDN. The request router includes a communication interface module configured to receive, from a first delivery node of a hierarchical layer of the CDN, a routing request to bypass the first delivery node for content delivery to a user equipment; and a selection module configured to, as a result of receiving the routing request to bypass the first delivery node for content delivery to the user equipment, select at least a second delivery node for the content delivery to the user equipment.

According to yet another alternative aspect of the disclosure, a first delivery node of a multi-tier Content Delivery Network (CDN) is provided, each tier corresponding to a hierarchical layer of the CDN. The first delivery node including a communication interface module configured to: communicate, to a request router, a routing request to bypass the first delivery node for content delivery to a user equipment, the first delivery node being in a hierarchical layer of the CDN; and receive an indication of at least a second delivery node for the content delivery to the user equipment, as a result of the routing request to bypass the first delivery node.

BRIEF DESCRIPTION OF THE DRAWINGS

A more complete understanding of the present embodiments, and the attendant advantages and features thereof, will be more readily understood by reference to the following detailed description when considered in conjunction with the accompanying drawings wherein.

DETAILED DESCRIPTION

Figure 1:
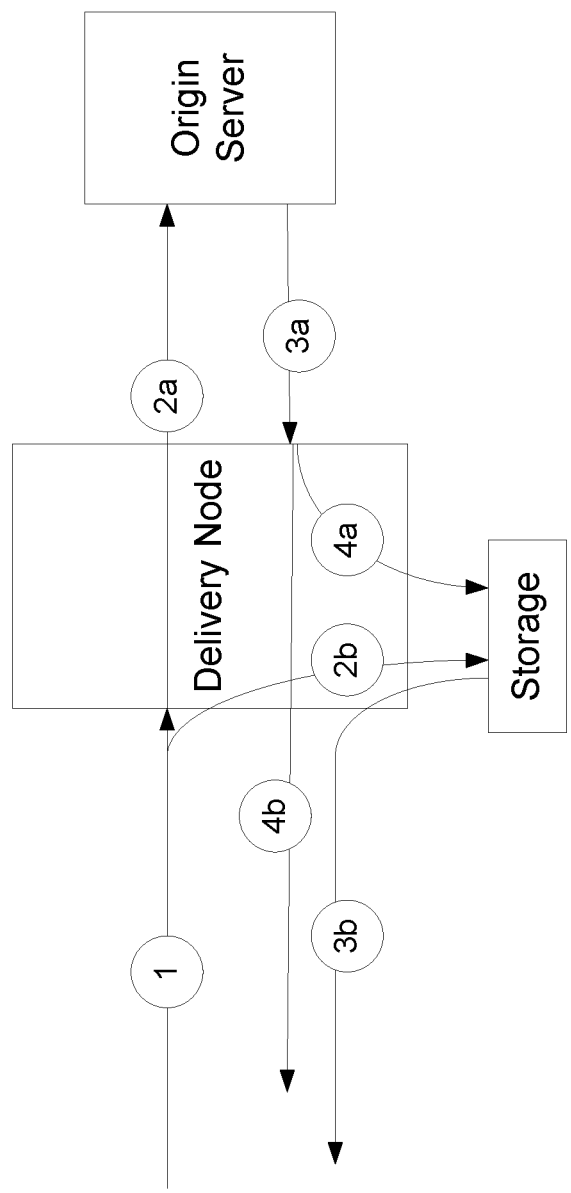
FIG. 1 is a schematic diagram illustrating at least two typical scenarios for a delivery node operating in a CDN.
Figure 2:
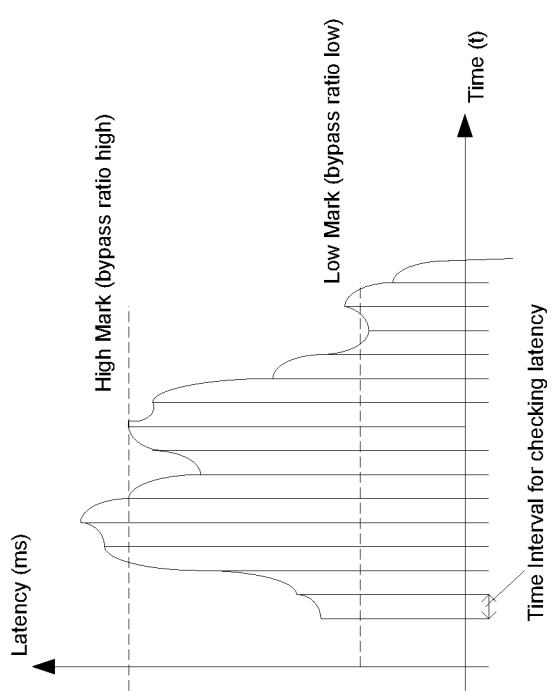
FIG. 2 is a graphical illustration of an Input/Output (I/O) protection mode for the DN operating in the CDN.

Before describing in detail exemplary embodiments, it is noted that the embodiments reside primarily in combinations of apparatus components and processing steps related to bypass delivery body. Accordingly, components have been represented where appropriate by conventional symbols in the drawings, showing only those specific details that are pertinent to understanding the embodiments so as not to obscure the disclosure with details that will be readily apparent to those of ordinary skill in the art having the benefit of the description herein.

As used herein, relational terms, such as "first" and "second," "top" and "bottom," and the like, may be used solely to distinguish one entity or element from another entity or element without necessarily requiring or implying any physical or logical relationship or order between such entities or elements. The terminology used herein is for the purpose of describing particular embodiments only and is not intended to be limiting of the concepts described herein. As used herein, the singular forms "a", "an" and "the" are intended to include the plural forms as well, unless the context clearly indicates otherwise. It will be further understood that the terms "comprises," "comprising," "includes" and/or "including" when used herein, specify the presence of stated features, integers, steps, operations, elements, and/or components, but do not preclude the presence or addition of one or more other features, integers, steps, operations, elements, components, and/or groups thereof.

In embodiments described herein, the joining term, "in communication with" and the like, may be used to indicate electrical or data communication, which may be accomplished by physical contact, induction, electromagnetic radiation, radio signaling, infrared signaling or optical signaling, for example. One having ordinary skill in the art will appreciate that multiple components may interoperate and modifications and variations are possible of achieving the electrical and data communication.

In some embodiments described herein, the term "coupled," "connected," and the like, may be used herein to indicate a connection, although not necessarily directly, and may include wired and/or wireless connections.

In some embodiments, the non-limiting term user equipment (UE) or client device or end-user client device are used interchangeably. The UE herein can be any type of communication device capable of communicating with a node of the CDN, such as an RR and/or a DN. The UE herein can by any type of communication device capable of communicating with a cloud service provider and/or a network node and/or a server, via a wired connection and/or a wireless connection. The UE can be, for example, a personal computer (PC), a Tablet, a mobile terminal. The UE can, in some embodiments, be considered a client terminal, usable by a user (e.g., end-user client device) to request content from at least one content provider according to one or more of the techniques described herein. The UE may also be a radio communication device, target device, device to device (D2D) UE, machine type UE or UE capable of machine to machine communication (M2M), low-cost and/or low-complexity UE, a sensor equipped with UE, Tablet, mobile terminals, smart phone, laptop embedded equipped (LEE), laptop mounted equipment (LME), USB dongles, Customer Premises Equipment (CPE), an Internet of Things (IoT) device, or a Narrowband IoT (NB-IOT) device etc.

In some embodiments, a content delivery network (CDN) may include a geographically distributed collection of nodes (which may also be referred to as delivery nodes or edge nodes or edge servers, etc.) that may be managed by one or more control or management devices, such as for example, a request router. In some embodiments, the CDN may also be considered a content distribution network or other type of content distribution network whose primary goal(s) include caching content (e.g., web content) at locations that are physically closer to end-user client devices consuming such content. For example, some CDN services may include hundreds or even thousands of edge delivery nodes distributed across large geographic areas, such as, several cities, states, or even countries.

One or more request routers may provide a request routing service that routes traffic through the CDN. Such traffic may include, for example, routing requests from delivery nodes, content requests from delivery nodes and UEs, responses and content delivery to UEs, content delivery from delivery nodes, etc.

In some embodiments, the delivery node may be considered a delivery caching node in a CDN. In some embodiments, the delivery node is configured to cache content from one or more content provider origin servers and deliver content to client devices. In some embodiments, the CDN may be organized into a multi-tier hierarchy of delivery nodes, where each tier may correspond to a hierarchical layer of the CDN. In some embodiments, the terms layer and tier may be used interchangeably and may be used to indicate a set of delivery nodes within a CDN having a particular type of function or role within the hierarchical organizational structure of the CDN. For example, edge delivery nodes may be considered the lowest tier or hierarchical layer whose primary role may be to cache and deliver content to end-user client devices, whereas the core delivery nodes may be considered, in some embodiments, to be a highest tier or hierarchical layer whose primary role is to access content provider origin servers, which may be outside of the CDN and subscribed to CDN caching and delivery services. There may also be intermediate tiers (e.g., region layer) that provide support services to the edge and core tiers/layers of the CDN.

In some embodiments, edge delivery nodes may be configured with a bypass mode, which may also be referred to herein interchangeably as an I/O protection mode. In some embodiments, the bypass/I/O protection mode may be triggered as a result of the delivery node determining that its processing load has at least met a threshold. The bypass mode may involve a bypass ratio parameter, whereby a certain number of content requests, determined by the bypass ratio, are bypassed by the delivery node in the bypass mode. As used herein, in some embodiments of the disclosure, the terms "bypass" and "bypassed" are intended to indicate the delivery node performing the bypass and being bypassed is either proxying content (from another delivery node or an origin server) to a requesting end-user client device (e.g., forwarding content instead of accessing the delivery node's own local cache for the content) or is redirecting the end-user client device to another delivery node by sending the end-user client device an indication (e.g., address) of the other delivery node. Thus, some embodiments of the present disclosure may perform bypass with involvement from the end-user client device (e.g., redirecting) and some embodiments of the present disclosure may perform bypass without involvement from the end-user client device (e.g., proxying content) (other than sending the content to the end-user device that is).

In some embodiments, requests corresponding to an adaptive bit rate (ABR) content request (e.g., ABR streaming) may determine whether the content request is a candidate for bypassing. In some embodiments, ABR may correspond to a performance management technique for streaming multimedia over networks by dynamically monitoring processing and memory capacity and making adjustments to video quality accordingly. ABR techniques may involve encoding source multimedia files (e.g., video) at varying bit rates and may include segmenting different bit rate streams into smaller segments. As used herein, in some embodiments, a manifest request may include a request for a manifest file, which manifest file may correspond to a catalog of segments of varying bitrates available for the ABR streaming of the requested content. In some embodiments, a segment file request may include a request for a bitrate segment indicated in the manifest file.

Note further, that functions described herein as being performed by a UE or a request router or a delivery node may be distributed over a plurality of UEs and/or a plurality of request routers and/or deliver nodes. In other words, it is contemplated that the functions of the request router and UE and delivery node described herein are not limited to performance by a single physical device and, in fact, can be distributed among several physical devices.

Unless otherwise defined, all terms (including technical and scientific terms) used herein have the same meaning as commonly understood by one of ordinary skill in the art to which this disclosure belongs. It will be further understood that terms used herein should be interpreted as having a meaning that is consistent with their meaning in the context of this specification and the relevant art and will not be interpreted in an idealized or overly formal sense unless expressly so defined herein.

Figure 3:
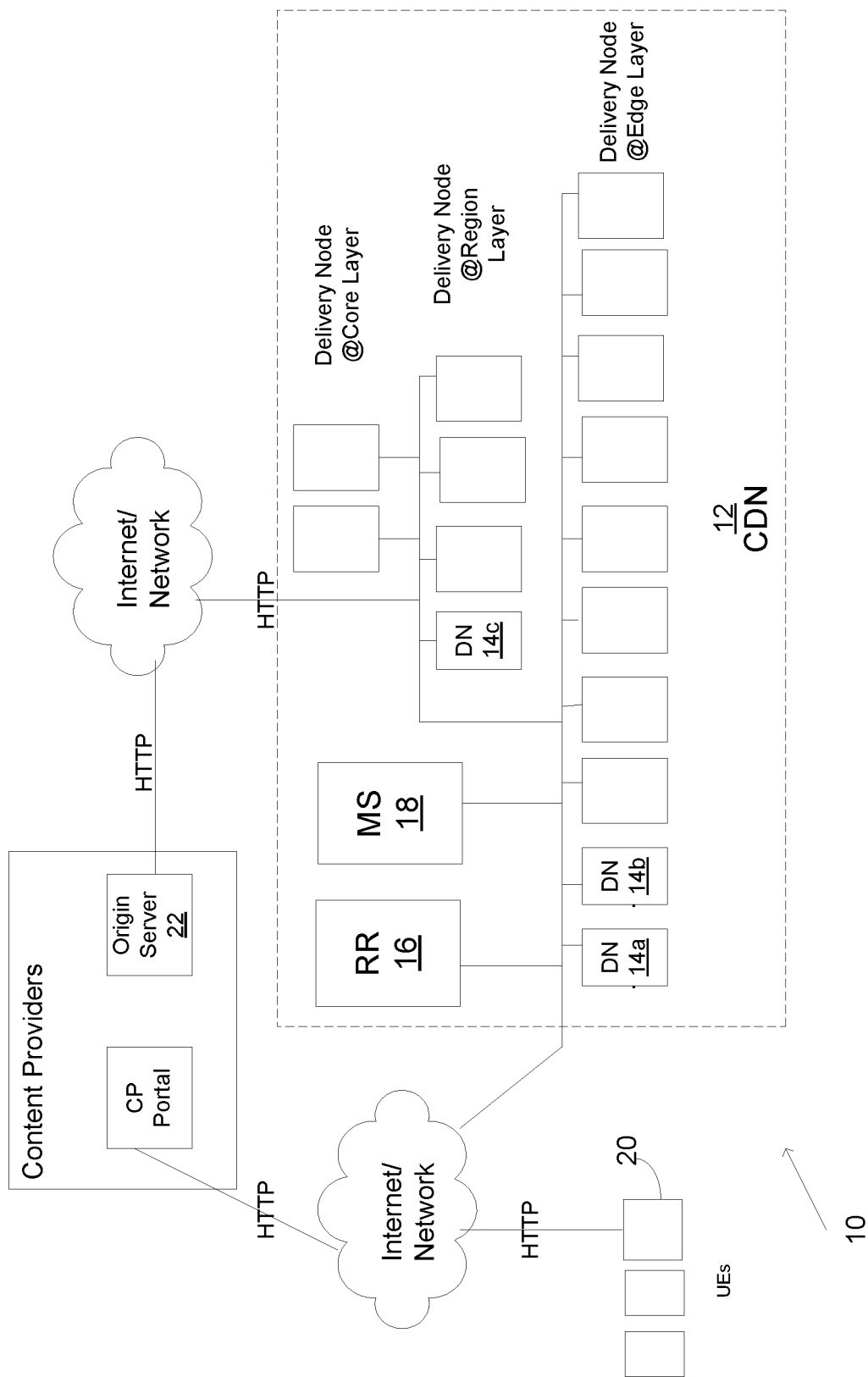
FIG. 3 is a block diagram of a system with a CDN in communication with UEs and a content provider over a network, according to one embodiment of the present disclosure.

Referring now to the drawings, in which like reference designators refer to like elements, there is shown in FIG. 3 an exemplary network, designated generally as "10". The exemplary network may include a CDN 12, which may be deployed with a hierarchical layer structure and may include at least one delivery node 14, at least one request router 16, and at least one monitoring service (MS) 18 in communication with one another, via one or more communication links, paths, connections, and/or networks using one or more communication protocols, where at least the delivery node (DN) 14 and the request router (RR) 16 may be configured to perform one or more of the methods and techniques described herein. In one embodiment, the nodes of the CDN 12 may communicate using a Hypertext Transfer Protocol (HTTP). In other embodiments, the nodes of the CDN 12 may communicate using other communication protocols. Although the system 10 depicted in FIG. 3 includes a single CDN 12, a single RR 16, and a single MS 18, it is contemplated that the system 10 may include any number of CDNs 12, RRs 16, and MSs 18, as well as, any number of DNs 14 in each layer/tier. The system 10 may further include any number of UEs 20 and origin servers 22 that may be in communication with the CDN 12, via one or more networks, such as, for example, the Internet.

Delivery nodes (DNs) 14 may be deployed in an edge layer, a region layer, and/or a core layer. Each of such layers may be considered a tier in a multi-tier/multi-layer hierarchy of the CDN 12. In one embodiment, for purposes of differentiating between DNs in different layers of the CDN 12, the DNs 14 at the edge layer may be referred to herein as 14a and 14b, and the DN 14 at a higher layer (e.g., region layer) may be referred to as 14c, as shown for example in FIG. 3. However, it should be understood that, in some embodiments, the different layers of the DNs 14 may be in yet other layers of the CDN 12, such as, for example, the core layer or yet other hierarchical layers. The DNs 14a, 14c at the edge layer may be considered to face the UEs 20, while the DNs 14 at the core layer may be connected to the CPs' origin servers 22. The CP may also include a portal, which may provide HTTP access to Internet Protocol networks, such as the Internet.

The RR 16 may be configured to be responsible for directing CDN 12 traffic, which traffic may include traffic between UEs 20 and DNs 14 at the edge layer, traffic among DNs at the edge, region and core layers, and traffic between DNs 14 at the core layer and CP origin servers 22. The RR 16 may be configured to communicate with a database that stores information about the accounts, service offerings, delivery nodes 14 and origin servers 22 associated with the CDN 12. The RR may use such information to make decisions about directing CDN 12 traffic.

Figure 4:
FIG. 4 is a block diagram of an exemplary request router, according to one embodiment of the present disclosure.

FIG. 4 illustrates an exemplary request router (RR) 16 for a multi-tier Content Delivery Network (CDN) 12. In an embodiment of the CDN 12, each tier corresponds to a hierarchical layer of the CDN 12. The RR 16 includes a communication interface 24, processing circuitry 26, and memory 28. The communication interface 24 may be configured to communicate with the delivery node 14 and/or other elements in the system 10 (e.g., UE 20, MS 18, etc.). In some embodiments, the communication interface 24 may be formed as or may include, for example, one or more radio frequency (RF) transmitters, one or more RF receivers, and/or one or more RF transceivers, and/or may be considered a radio interface. In some embodiments, the communication interface 24 may include a wired and/or a wireless interface. In one embodiment, the communication interface 24 may include or be associated with a network interface element, such as, for example, network interface card.

The processing circuitry 26 may include one or more processors 30 and memory, such as, the memory 28. In particular, in addition to a traditional processor and memory, the processing circuitry 26 may comprise integrated circuitry for processing and/or control, e.g., one or more processors and/or processor cores and/or FPGAs (Field Programmable Gate Array) and/or ASICs (Application Specific Integrated Circuitry) adapted to execute instructions. The processor 30 and/or the processing circuitry 26 may be configured to access (e.g., write to and/or read from) the memory 28, which may comprise any kind of volatile and/or nonvolatile memory, e.g., cache and/or buffer memory and/or RAM (Random Access Memory) and/or ROM (Read-Only Memory) and/or optical memory and/or EPROM (Erasable Programmable Read-Only Memory).

Thus, the RR 16 may further include software stored internally in, for example, memory 28, or stored in external memory (e.g., database) accessible by the RR 16 via an external connection. The software may be executable by the processing circuitry 26. The processing circuitry 26 may be configured to control any of the methods and/or processes described herein and/or to cause such methods, and/or processes to be performed, e.g., by the RR 16. The memory 28 is configured to store data, programmatic software code and/or other information described herein. In some embodiments, the software may include instructions that, when executed by the processor 30 and/or processing circuitry 26, causes the processor 30 and/or processing circuitry 26 to perform the processes described herein with respect to the RR 16. In some embodiments, such software may be considered a request routing service (RRS). In some embodiments, such software may include other services and functions, as well.

In one embodiment, the processing circuitry 26 of the RR 16 may be configured to receive, from a first delivery node 14a of a hierarchical layer of the CDN 12, a routing request to bypass the first delivery node 14a for content delivery to a user equipment 20. The processing circuitry 26 of the RR 16 is also configured to, as a result of receiving the routing request to bypass the first delivery node 14a for the content delivery to the user equipment 20, select at least a second delivery node 14b, 14c for the content delivery to the user equipment 20. In some embodiments, the processing circuitry 26 is configured to select the at least the second delivery node 14b, 14c for the content delivery to the user equipment 20 by being further configured to select the at least the second delivery node 14b, 14c for the content delivery to the user equipment 20 from at least a same hierarchical layer of the CDN 12 as the hierarchical layer of the first delivery node 14a. In some embodiments, the processing circuitry 26 is configured to select the at least the second delivery node 14b for the content delivery to the user equipment 20 by being further configured to select the at least the second delivery node 14b, 14c for the content delivery to the user equipment 20 from one of a same hierarchical layer of the CDN 12 as the hierarchical layer of the first delivery node 14*a* (e.g., edge layer) and a higher hierarchical layer (e.g., region layer, core layer) than the hierarchical layer of the first delivery node 14*a*, the selection being dependent on at least a number of delivery nodes 14 in the CDN 12 that are determined to be in a bypass mode.

In some embodiments, the hierarchical layer of the CDN is an edge layer of the CDN and the higher hierarchical layer is one of a region layer and a core layer of the CDN. In some embodiments, the processing circuitry 26 is further configured to select the at least the second delivery node 14*b*, 14*c* for the content delivery to the user equipment 20 by being further configured to select the at least the second delivery node 14*b*, 14*c* from a same hierarchical layer of the CDN 12 as the hierarchical layer of the first delivery node unless a number of delivery nodes 14 that are determined to be in a bypass mode at least meets a threshold number of delivery nodes 14 (e.g., all DNs 14 in CDN 12); and if the number of delivery nodes 14 that are in the bypass mode at least meets the threshold number of delivery nodes 14, select the at least the second delivery node 14*b*, 14*c* from one of an origin server 22 and a delivery node 14*c* in a higher hierarchical layer of the CDN 12 than the hierarchical layer of the first delivery node 14*a*. In some embodiments, the processing circuitry 26 is further configured to, if the selected at least the second delivery node 14*b*, 14*c* is in a same hierarchical layer of the CDN 12 as the hierarchical layer of the first delivery node 14*a*, communicate, to the first delivery node 14*a*, an indication to redirect a content delivery request from the user equipment 20 to the at least the second delivery node 14*b*, 14*c* in the same hierarchical layer of the CDN 12. In some embodiments, the indication to redirect the content delivery request includes at least an address (e.g., IP address) of the at least the second delivery node 14*b*, 14*c* to which the user equipment 20 is to be redirected.

In some embodiments, the processing circuitry 26 is further configured to, if the selected at least the second delivery node 14*b*, 14*c* is not in a same hierarchical layer of the CDN 12 as the hierarchical layer of the first delivery node 14*a*, communicate, to the first delivery node 14*a*, an indication to, instead of accessing local cache (e.g., storage memory at the first delivery node 14*a*), proxy a content delivery request for one of an origin server 22 and a delivery node 14*c* in a higher hierarchical layer of the CDN than the hierarchical layer of the first delivery node 14*a*. In some embodiments, the indication to proxy the content delivery request includes an indication to proxy the content request using Hypertext Transfer Protocol. In some embodiments, for adaptive bit rate (ABR) content requests, only manifest requests are permitted to bypass the first delivery node 14*a* for the selected at least the second delivery node 14*b*, 14*c*. In some embodiments, for ABR content requests, segment file requests are not permitted to bypass the first delivery node 14*a* for the selected at least the second delivery node 14*b*, 14*c*. In some embodiments, the processing circuitry 26 is configured to receive, from the first delivery node 14*a*, the routing request to bypass the first delivery node 14*a* by receiving the routing request comprising at least a bypass ratio and an Internet Protocol, IP, address of the user equipment 20. In some embodiments, the bypass ratio is a ratio of a number of content delivery requests that should bypass the first delivery node 14*a* to a total number of content delivery requests assigned to the first delivery node 14*a*. In some embodiments, the bypass ratio is determined based on at least a processing load of the first delivery node 14*a*. In some embodiments, the processing circuitry 26 is further configured to select the at least the second delivery node 14*b*, 14*c* based on at least a bypass ratio and an Internet Protocol, IP, address of the user equipment 20. In some embodiments, the processing circuitry 26 is further configured to select the at least the second delivery node 14*b*, 14*c* based on at least a key performance indicator of the at least the second delivery node 14*b*, 14*c*. In some embodiments, the processing circuitry 26 is further configured to determine a number of delivery nodes 14 that are in a bypass mode, and, as a result of determining that the number of delivery nodes 14 that are in the bypass mode at least meets a threshold, communicate, to a Monitoring Service 18, an indication that current traffic volume at least meets a threshold capacity of the CDN 12. In some embodiments, the processing circuitry 26 is further configured to: determine whether to proxy a content delivery request to the at least the second delivery node 14*b*, 14*c* in a higher hierarchical layer of the CDN 12 than the hierarchical layer of the first delivery node 14*a*; and if the content delivery request is determined to be proxied to the at least the second delivery node 14*b*, 14*c* in the higher hierarchical layer of the CDN 12, one of: statically determine a routing path between the first delivery node 14*a* in the hierarchical layer and the at least the second delivery node 4*b*, 14 in the higher hierarchical layer; and dynamically determine, via a hashing algorithm, a routing path between the first delivery node 14*a* in the hierarchical layer and the at least the second delivery node 14*b*, 14*c* in the higher hierarchical layer.

Figure 5:
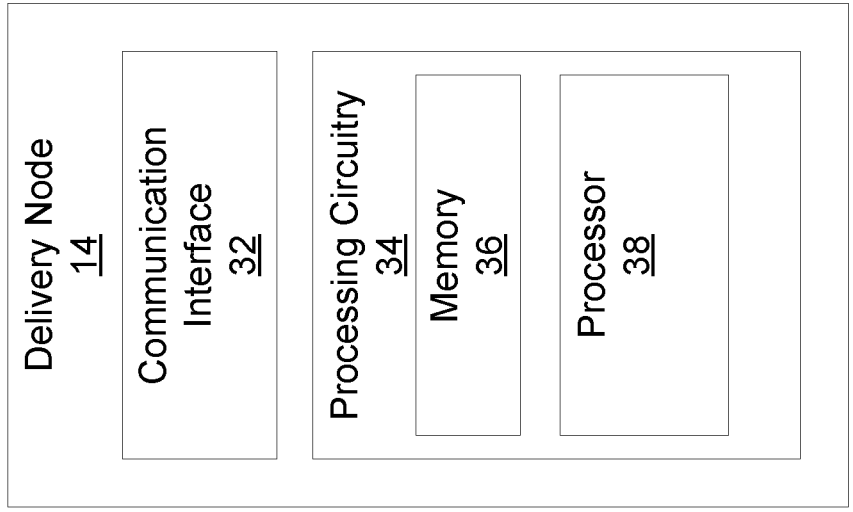
FIG. 5 is a block diagram of an exemplary delivery node, according to one embodiment of the present disclosure.

FIG. 5 illustrates an exemplary delivery node (DN) 14 (e.g., 14*a*) for a multi-tier Content Delivery Network (CDN) 12. In an embodiment of the CDN 12, each tier corresponds to a hierarchical layer of the CDN 12. The DN 14 (e.g., 14*a*) includes a communication interface 32, processing circuitry 34, and memory 36. The communication interface 32 may be configured to communicate with the RR 16 and/or other elements in the system 10 (e.g., UE 20, MS 18, etc.). In some embodiments, the communication interface 32 may be formed as or may include, for example, one or more radio frequency (RF) transmitters, one or more RF receivers, and/or one or more RF transceivers, and/or may be considered a radio interface. In some embodiments, the communication interface 32 may include a wired and/or a wireless interface. In one embodiment, the communication interface 32 may include or be associated with a network interface element, such as, for example, network interface card.

The processing circuitry 34 may include one or more processors 38 and memory, such as, the memory 36. In particular, in addition to a traditional processor and memory, the processing circuitry 34 may comprise integrated circuitry for processing and/or control, e.g., one or more processors and/or processor cores and/or FPGAs (Field Programmable Gate Array) and/or ASICs (Application Specific Integrated Circuitry) adapted to execute instructions. The processor 38 and/or the processing circuitry 34 may be configured to access (e.g., write to and/or read from) the memory 36, which may comprise any kind of volatile and/or nonvolatile memory, e.g., cache and/or buffer memory and/or RAM (Random Access Memory) and/or ROM (Read-Only Memory) and/or optical memory and/or EPROM (Erasable Programmable Read-Only Memory).

Thus, the DN 14 16 may further include software stored internally in, for example, memory 36, or stored in external memory (e.g., database) accessible by the DN 14 via an external connection. The software may be executable by the processing circuitry 34. The processing circuitry 34 may be configured to control any of the methods and/or processes described herein and/or to cause such methods, and/or processes to be performed, e.g., by the DN 14. The memory 36 is configured to store data, programmatic software code and/or other information described herein. In some embodiments, the software may include instructions that, when executed by the processor 38 and/or processing circuitry 34, causes the processor 38 and/or processing circuitry 34 to perform the processes described herein with respect to the DN 14. In some embodiments, such software may be considered a delivery node caching service. In some embodiments, such software may include other services and functions, as well.

In one embodiment, the processing circuitry 34 is configured to communicate, to the RR 16, a routing request to bypass the first delivery node 14*a* for content delivery to a user equipment 20, the first delivery node 14*a* being in a hierarchical layer of the CDN 12. The processing circuitry 34 is further configured to receive an indication of at least a second delivery node 14*b*, 14*c* for the content delivery to the user equipment 20, as a result of the routing request to bypass the first delivery node 14*a*. In some embodiments, the at least the second delivery node 14*b*, 14*c* is in a same hierarchical layer of the CDN 12 as the hierarchical layer of the first delivery node 14*a*. In some embodiments, the at least the second delivery node 14*b*, 14*c* is in one of a same hierarchical layer of the CDN 12 as the hierarchical layer of the first delivery node 14*a* and a higher hierarchical layer than the hierarchical layer of the first delivery node 14*a* depending on at least a number of delivery nodes 14 in the CDN 12 that are determined to be in a bypass mode. In some embodiments, the processing circuitry 34 is further configured to receive a content delivery request from the user equipment 20; determine whether the content delivery request is an adaptive bit rate (ABR) content delivery request; and, if the content delivery request is an ABR content delivery request, determine whether the ABR content delivery request is one of a manifest request and a segment file request. In some embodiments, the processing circuitry 34 is further configured to, if the ABR content delivery request is the manifest request, communicate, to the RR 16, the routing request to bypass the first delivery node 14*a* for the content delivery to the user equipment 20. In some embodiments, the processing circuitry 34 is further configured to, if the ABR content delivery request is the segment file request, deliver, to the user equipment 20, a segment file corresponding to the segment file request, instead of communicating the routing request to the RR 16 to bypass the first delivery node 14*a*. In some embodiments, the processing circuitry 34 is configured to communicate, to the RR 16, the routing request to bypass the first delivery node 14*a* by communicating the routing request including at least a bypass ratio and an Internet Protocol, IP, address of the user equipment 20. In some embodiments, the processing circuitry 34 is further configured to determine the bypass ratio based on at least a processing load of the first delivery node 14*a* (e.g., processing load of the processing circuitry 34 and/or processor 38). In some embodiments, the hierarchical layer of the first delivery node 14*a* and the second delivery node 14*b* is an edge layer of the CDN 12. In some embodiments, the processing circuitry 34 is further configured to communicate the indication of the at least the second delivery node 14*b*, 14*c* to the user equipment 20, the indication being an address of the at least the second delivery node 14*b*, 14*c*.

In some embodiments, the processing circuitry 34 is configured to receive the indication of the at least the second delivery node 14*b*, 14*c* for the content delivery to the user equipment 20, as the result of the routing request to bypass the first delivery node 14*a*, by being further configured to receive at least one of: an indication to redirect a content delivery request from the user equipment 20 to the at least the second delivery node 14*b* in the same hierarchical layer of the CDN 12; and an indication to proxy a content delivery request for one of an origin server 22 and a delivery node 14*c* in a higher hierarchical layer of the CDN 12 than the hierarchical layer of the first delivery node 14*a*. In some embodiments, the processing circuitry 34 is further configured to: as a result of the received indication to redirect the content delivery request, communicate an address of the at least the second delivery node 14*b*, 14*c* to the user equipment 20; and as a result of the received indication to proxy the content delivery request, receive content from the one of the origin server 22 and the delivery node 14*b*, 14*c* in the higher hierarchical layer of the CDN 12 and forward the content to the user equipment 20, without accessing local cache (e.g., storage memory at the first delivery node 14*a*). In some embodiments, the processing circuitry 34 is further configured to: if the indication of the at least the second delivery node 14*b*, 14*c* indicates that the content delivery to the user equipment 20 is to be proxied to the at least the second delivery node 14*b*, 14*c* in a higher hierarchical layer of the CDN 12 than the hierarchical layer of the first delivery node 14*a*, one of: obtain a statically determined routing path between the first delivery node 14*a* in the hierarchical layer and the at least the second delivery node 14*b*, 14*c* in the higher hierarchical layer; and obtain a dynamically determined routing path between the first delivery node 14*a* in the hierarchical layer and the at least the second delivery node 14*b*, 14*c* in the higher hierarchical layer.

Figure 6:
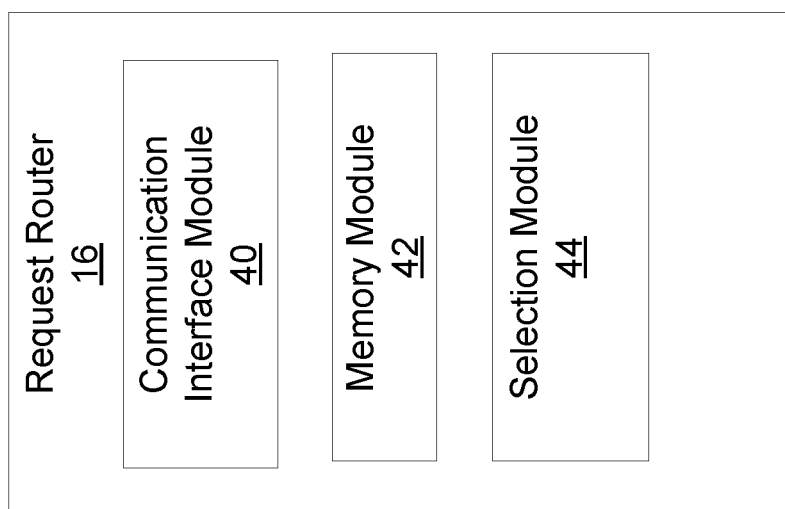
FIG. 6 is a block diagram of an alternative request router, according to one embodiment of the present disclosure.

FIG. 6 is a block diagram of an alternative RR 16 for a multi-tier CDN 12, each tier corresponding to a hierarchical layer of the CDN 12. The alternative RR 16 includes a communication interface module 40 configured to receive, from a first delivery node 14*a* of a hierarchical layer of the CDN 12, a routing request to bypass the first delivery node 14*a* for content delivery to a user equipment 20. The RR 16 may also include a memory module 42. The memory module 42 may store instructions that, when executed by a processor, configure the processor to perform one or more of the methods and techniques described herein with respect to the RR 16. The RR 16 may further include a selection module 44 configured to, as a result of receiving the routing request to bypass the first delivery node 14*a* for content delivery to the user equipment 20, select at least a second delivery node 14*b*, 14*c* for the content delivery to the user equipment 20.

Figure 7:
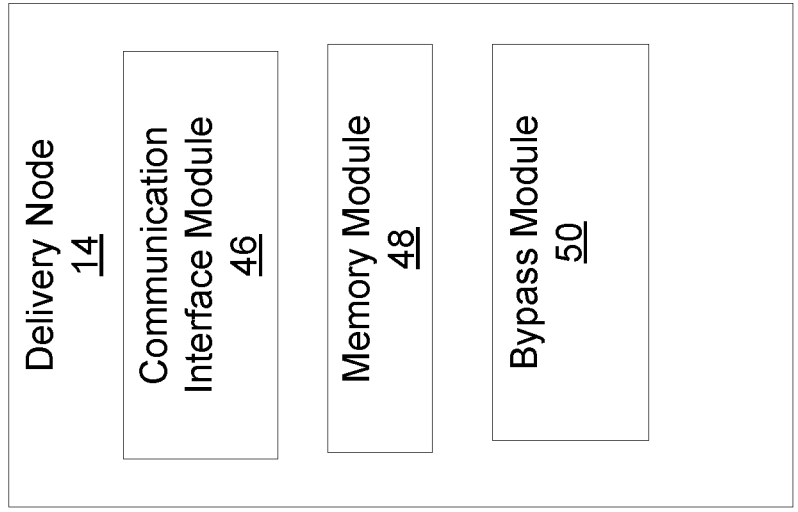
FIG. 7 is a block diagram of an alternative delivery node, according to one embodiment of the present disclosure.

FIG. 7 is a block diagram of an alternative DN 14 (e.g., 14*a*) for a multi-tier CDN 12, each tier corresponding to a hierarchical layer of the CDN 12. The alternative DN 14 (e.g., 14*a*) includes a communication interface module 46 configured to communicate, to a RR 16, a routing request to bypass the first delivery node 14*a* for content delivery to a user equipment 20, the first delivery node 14*a* being in a hierarchical layer of the CDN 12. The communication interface module 46 may further be configured to receive an indication of at least a second delivery node 14*b*, 14*c* for the content delivery to the user equipment 20, as a result of the routing request to bypass the first delivery node 14*a*. The DN 14 may also include a memory module 48. The memory module 48 may store instructions that, when executed by a processor, configured the processor to perform one or more of the methods and techniques described herein with respect to the DN 14. The DN 14 may further include a bypass module 50 configured to determine a bypass ratio based on at least a processing load of the first delivery node 14*a*.

Figure 8:
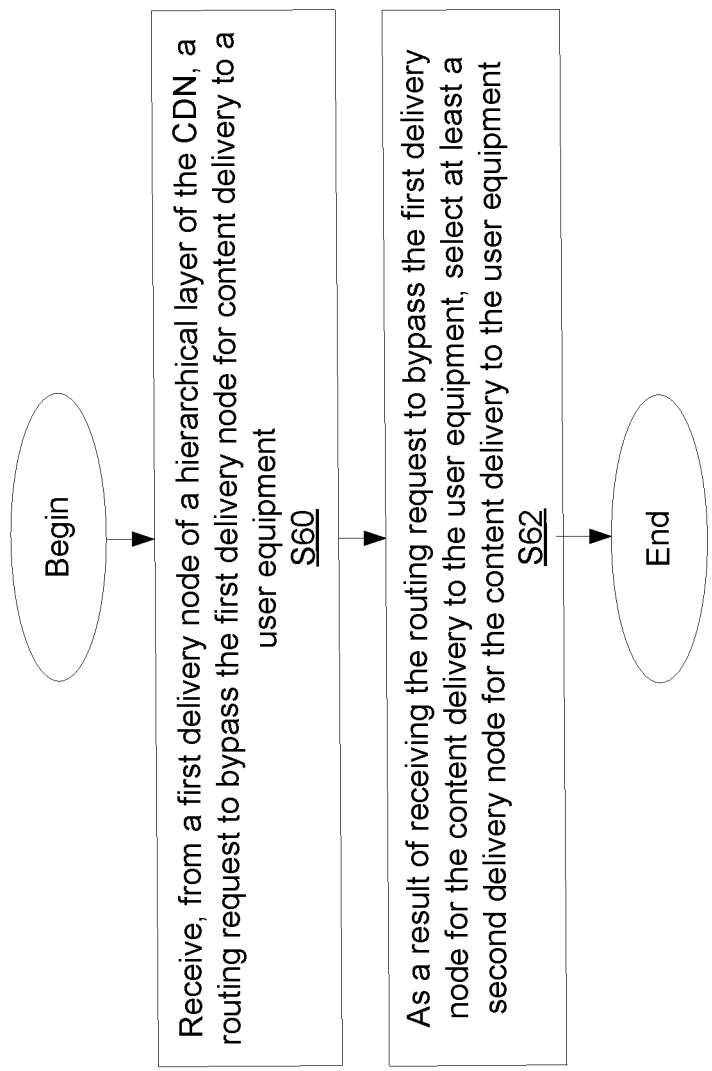
FIG. 8 is a flowchart for an exemplary method implemented in a request router, according to one embodiment of the present disclosure.

FIG. 8 is a flowchart illustrating an exemplary method implemented in a request router, such as, for example, the RR 16 of a multi-tier CDN 12, each tier corresponding to a hierarchical layer of the CDN 12. The exemplary method includes receiving, from a first delivery node 14a of a hierarchical layer of the CDN 12, a routing request to bypass the first delivery node 14a for content delivery to a user equipment 20 (block S60); and as a result of receiving the routing request to bypass the first delivery node 14a for the content delivery to the user equipment 20, selecting at least a second delivery node 14b, 14c for the content delivery to the user equipment 20 (block S62). In some embodiments, selecting the at least the second delivery node 14b, 14c for the content delivery to the user equipment 20 further comprises selecting the at least the second delivery node 14b, 14c for the content delivery to the user equipment 20 from at least a same hierarchical layer of the CDN 12 as the hierarchical layer of the first delivery node 14a. In some embodiments, selecting the at least the second delivery node 14b, 14c for the content delivery to the user equipment 20 further comprises selecting the at least the second delivery node 14b, 14c for the content delivery to the user equipment 20 from one of a same hierarchical layer of the CDN 12 as the hierarchical layer of the first delivery node 14a and a higher hierarchical layer than the hierarchical layer of the first delivery node 14a, the selection being dependent on at least a number of delivery nodes 14 in the CDN 12 that are determined to be in a bypass mode. In some embodiments, the hierarchical layer of the CDN 12 is an edge layer of the CDN 12 and the higher hierarchical layer is one of a region layer and a core layer of the CDN 12. In some embodiments, selecting the at least the second delivery node 14b, 14c for the content delivery to the user equipment 20 further includes selecting the at least the second delivery node 14b, 14c from a same hierarchical layer of the CDN 12 as the hierarchical layer of the first delivery node 14a unless a number of delivery nodes 14 that are determined to be in a bypass mode at least meets a threshold number of delivery nodes 14 (e.g., all DNs 14 in the CDN 12).

In a further embodiment, if the number of delivery nodes 14 that are in the bypass mode at least meet the threshold number of delivery nodes 14, selecting the at least the second delivery node 14b, 14c from one of an origin server 22 and a delivery node 14c in a higher hierarchical layer of the CDN 12 than the hierarchical layer of the first delivery node 14a. In some embodiments, the method further includes, if the selected at least the second delivery node 14b, 14c is in a same hierarchical layer of the CDN 12 as the hierarchical layer of the first delivery node 14a, communicating, to the first delivery node 14a, an indication to redirect a content delivery request from the user equipment 20 to the at least the second delivery node 14b, 14c in the same hierarchical layer of the CDN 12. In some embodiments, the indication to redirect the content delivery request includes at least an address (e.g., IP address) of the at least the second delivery node 14b, 14c to which the user equipment 20 is to be redirected. In some embodiments, the method further includes, if the selected at least the second delivery node 14b, 14c is not in a same hierarchical layer of the CDN 12 as the hierarchical layer of the first delivery node 14a, communicate, to the first delivery node 14a, an indication to, instead of accessing local cache (e.g., storage memory on the DN 14a), proxy a content delivery request for one of an origin server 22 and a delivery node 14c in a higher hierarchical layer of the CDN 12 than the hierarchical layer of the first delivery node 14a. In some embodiments, the indication to proxy the content delivery request includes an indication to proxy the content request using Hypertext Transfer Protocol (HTTP). In some embodiments, for adaptive bit rate (ABR) content requests, only manifest requests are permitted to bypass the first delivery node 14a for the selected at least the second delivery node 14b, 14c. In some embodiments, for ABR content requests, segment file requests are not permitted to bypass the first delivery node for the selected at least the second delivery node 14b, 14c. In some embodiments, the receiving, from the first delivery node 14a, the routing request to bypass the first delivery node 14a further includes receiving the routing request including at least a bypass ratio and an Internet Protocol, IP, address of the user equipment 20. In some embodiments, the bypass ratio is a ratio of a number of content delivery requests that should bypass the first delivery node 14a to a total number of content delivery requests assigned to the first delivery node 14a. In some embodiments, the bypass ratio is determined based on at least a processing load of the first delivery node 14a.

In some embodiments, selecting the at least the second delivery node 14b, 14c further includes selecting the at least the second delivery node 14b, 14c based on at least a bypass ratio and an IP address of the user equipment 20. In some embodiments, selecting the at least the second delivery node 14b, 14c further includes selecting the at least the second delivery node 14b, 14c based on at least a key performance indicator of the at least the second delivery node 14b, 14c. In some embodiments, the method further includes determining a number of delivery nodes 14 that are in a bypass mode; and as a result of determining that the number of delivery nodes 14 that are in the bypass mode at least meets a threshold (e.g., all DNs 14 in the CDN 12), communicating, to a Monitoring Service 18, an indication that current traffic volume at least meets a threshold capacity of the CDN 12.

Figure 9:
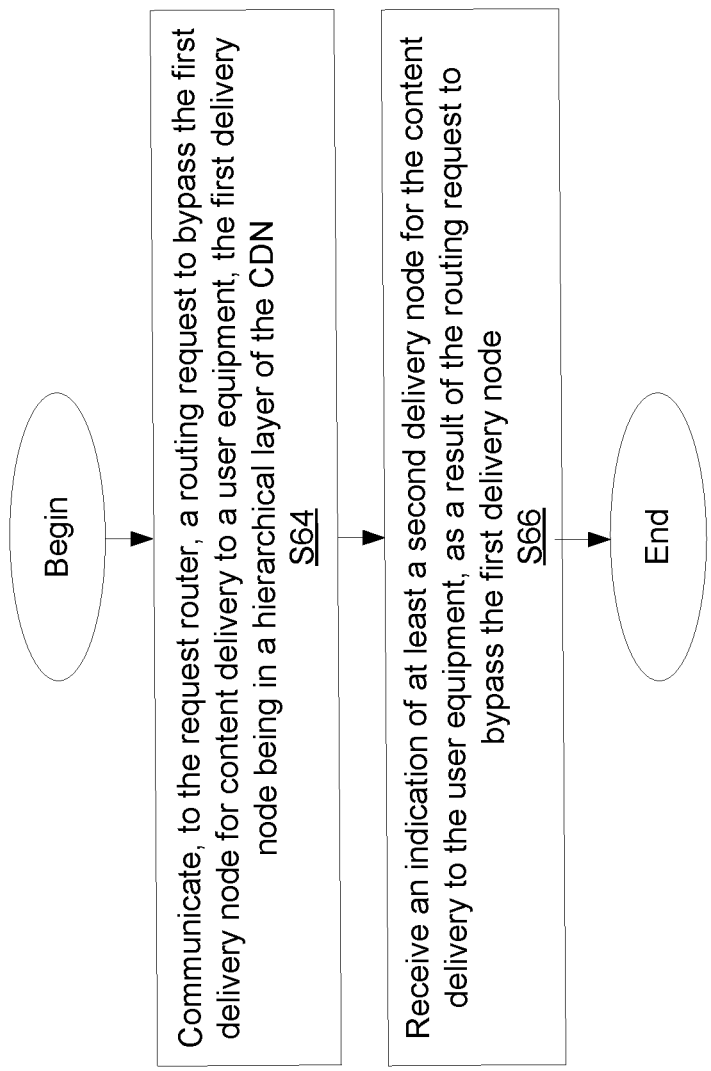
FIG. 9 is a flowchart for an exemplary method implemented in a delivery node, according to one embodiment of the present disclosure.

FIG. 9 is a flowchart illustrating an exemplary method implemented in a delivery node, such as, for example, the DN 14 (e.g., 14a) of a multi-tier CDN 12, each tier corresponding to a hierarchical layer of the CDN 12. The exemplary methods include communicating, to a request router 16, a routing request to bypass the first delivery node 14 (e.g., 14a) for content delivery to a user equipment 20, the first delivery node 14 being in a hierarchical layer of the CDN 12 (block S64). The exemplary method further includes receiving an indication of at least a second delivery node 14, 14c for the content delivery to the user equipment 20, as a result of the routing request to bypass the first delivery node 14a (block S66). In some embodiments, the at least the second delivery node 14b, 14c is in a same hierarchical layer of the CDN 12 as the hierarchical layer of the first delivery node 14a. In some embodiments, the at least the second delivery node 14b, 14c is in one of a same hierarchical layer of the CDN 12 as the hierarchical layer of the first delivery node 14a and a higher hierarchical layer than the hierarchical layer of the first delivery node 14a depending on at least a number of delivery nodes 14 in the CDN 12 that are determined to be in a bypass mode. In some embodiments, the method further includes receiving a content delivery request from the user equipment 20, determining whether the content delivery request is an adaptive bit rate (ABR) content delivery request; and, if the content delivery request is an ABR content delivery request, determining whether the ABR content delivery request is one of a manifest request and a segment file request. In some embodiments, the method further includes, if the ABR content delivery request is the manifest request, communicating, to the request router 16, the routing request to bypass the first delivery node 14a for the content delivery to the user equipment 20. In some embodiments, the method further includes, if the ABR content delivery request is the segment file request, delivering, to the user equipment 20, a segment file corresponding to the segment file request, instead communicating the routing request to bypass the first delivery node 14a. In some embodiments, communicating, to the request router 16, the routing request to bypass the first delivery node 14a further includes communicating the routing request comprising at least a bypass ratio and an Internet Protocol (IP) address of the user equipment 20. In some embodiments, the method further includes determining the bypass ratio based on at least a processing load of the first delivery node 14a. In some embodiments, the hierarchical layer of the first delivery node 14a and the second delivery node 14b is an edge layer of the CDN 12. In some embodiments, the method further includes communicating the indication of the at least the second delivery node 14b, 14c to the user equipment 20, the indication being an address of the at least the second delivery node 14b, 14c. In some embodiments, receiving the indication of the at least the second delivery node 14b, 14c for the content delivery to the user equipment 20, as the result of the routing request to bypass the first delivery node 14a further comprises includes receiving at least one of: an indication to redirect a content delivery request from the user equipment 20 to the at least the second delivery node 14b in the same hierarchical layer of the CDN; and an indication to proxy a content delivery request for one of an origin server 22 and a delivery node 14c in a higher hierarchical layer of the CDN 12 than the hierarchical layer of the first delivery node 14a. In some embodiments, the method further includes at least one of: as a result of the received indication to redirect the content delivery request, communicating an address of the at least the second delivery node 14b, 14c to the user equipment 20; and as a result of the received indication to proxy the content delivery request, receiving content from the one of the origin server 22 and the delivery node 14c in the higher hierarchical layer of the CDN 12 and forward the content to the user equipment 20, without accessing local cache (e.g., storage memory of the DN 14a).

In some embodiments, the methods and apparatuses described in the present disclosure may advantageously provide for utilizing a Request Routing Service (RRS) provided by, for example, the RR 16, to determine the candidate DN 14 to handle the bypass client request, instead of permitting the DN 14 to bypass itself to proxy the content from the origin server 22. Specifically, in some embodiment, the RR 16 may be configured to determine an optimal candidate DN 14 to handle a client request for content; instead of permitting the originally-assigned DN 14 (e.g., 14a) to bypass itself by, for example, proxying content from, e.g., an upstream DN 14 or the origin server 22. By configuring the RR 16 to determine an optimal candidate DN 14, the RR 16 (having access to key performance indicators and other information from all DNs 14 in the CDN 12) may be able to reduce traffic flow to the higher tiers of the CDN 12 and to the origin server 22. In other words, in some embodiments, the RR 16 can be configured to utilize bypass mode in DNs 14 to horizontally distribute at least some of the bypass traffic to other DNs 14 in the same edge layer, rather than automatically requesting content from higher tier DNs 14 or the origin server 22. Origin servers 22 and higher tier DNs 14 may have a limited capacity to respond to client requests for content.

In one embodiment, when the DN 14 triggers I/O protection, the DN 14 sets a bypass ratio parameter or attribute, according to a predetermined configuration (e.g. as a result of a measured processing latency at the DN 14 at least meeting a predetermined latency threshold, setting the bypass ratio to a particular percentage value such as 20%, meaning that 20% of incoming client requests originally assigned to the DN 14 shall bypass the DN 14 in order to reduce the processing load on the current DN 14). In some embodiments, the bypass ratio is measured and/or determined on each DN 14 independently by, for example, measuring a processing latency associated with READ and/or WRITE attempts and determining a bypass ratio based at least in part on the measured/estimated latency. In some embodiments, the bypass ratio may be determined as a percentage of a number of client requests that bypass the current DN 14 over (divided by) a total number of the incoming client requests received by the current DN 14. In some embodiments, "bypassing the DN 14" may be considered to mean that the client request is either redirected from the DN 14 to another, different DN 14 in the same tier/layer (e.g., by communicating an indication of the different DN 14, e.g., IP address, to the UE 20 so that the UE 20 can request the content from the different DN 14) and/or by accessing another, different DN 14 at a higher tier/layer (e.g., by proxying the requested content from the different DN 14 through receiving and forwarding the received content to the UE 20, instead of executing READ and WRITE operations to local cache). In some embodiments, the RR 16 may be configured to prioritize redirecting of client content requests to other DNs 14 in the same layer, over proxying the requested content from upstream DNs 14 or the origin server 22, so as to reduce the risk of overloading upstream DNs 14 and origin servers 22 with content requests. In some embodiments, such priority is overcome only when all or at least a threshold number of DNs 14 in an edge layer of the CDN 12 are in a bypass mode. For example, the RR 16 may be configured to redirect bypass content delivery requests for other DNs 14 in the edge layer, unless all DNs in the edge layer are in bypass mode; in which case the RR 16 may permit the DN 14a to proxy content from the origin server 22 and/or a DN 14c in a higher layer of the CDN 12. In some embodiments of the present disclosure, while redirection of client content requests is considered to involve the UE 20 (e.g., sending the UE 20 the address of the selected DN 14b so that the UE 20 can directly re-request the content), proxying content requests is not considered to involve the UE 20. In other words, in some embodiments, proxying the content includes receiving content from another DN 14 and forwarding the received content to the UE 20 transparently, without instructing the UE 20 to directly request the content from the other DN 14.

In some embodiments of the present disclosure, as a result of entering and/or remaining in an I/O protection mode, the DN may communicate a routing request to the RR 16 in order to receive, from the RR 16, an indication of a DN 14 that should deliver the requested content. For example, the RR 16 may determine that a particular DN 14 has a very low latency and is geographically located fairly closely to the UE 20, therefore, the RR may determine the such DN 14 should handle the bypassed client request for content since such DN 14 is relatively close to the UE 20 and is not exhibiting parameters associated with high processing loads (e.g., high latency, bypass mode, etc.). In some embodiments, both the bypass ratio and the IP address of the UE 20 are included in the routing request, which can be embedded in, for example, a Universal Resource Locator (URL) query parameter, X-Bypass header, or other methods. In some embodiments, the RR 16 may select the DN 14 based on the received information in the routing request, as well as, the status of each DN 14 within CDN 12. In some embodiments, the RR 16 may also consider which DNs 14 in the CDN 12 are in a bypass or I/O protection mode when determining which DN 14 should service the bypassed client request for content. For example, a DN 14 that is in a bypass mode or that has a high bypass ratio (as compared to the bypass ratio associated with other DNs 14) may not be considered an optimal candidate DN 14.

Figure 10:
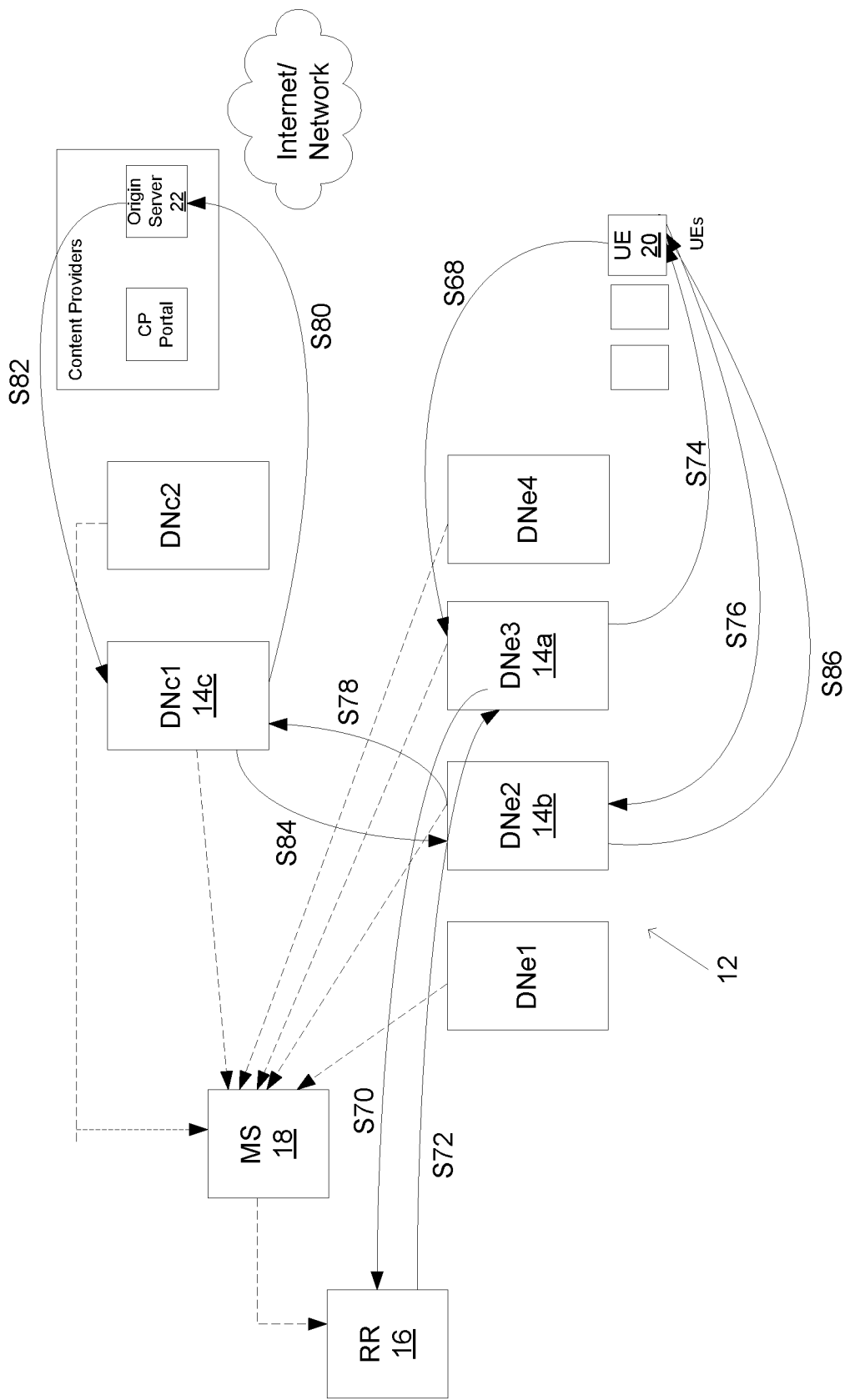
FIG. 10 is a flow diagram for an exemplary method implemented in the system, according to one embodiment of the present disclosure.

FIG. 10 is an exemplary flow diagram, illustrating one exemplary embodiment for implementing bypass of a DN 14, according to the methods and techniques described in the present disclose. As shown in FIG. 10, a client content request is directed to a DN 14*a* (e.g., DNe3) in an edge layer facing the requesting UE 20 (S68). In one embodiment, the DN 14*a* enters an I/O protection (bypass) mode (e.g., due to measured READ/WRITE latency at least meeting a predetermined threshold latency) and communicates a routing request to the RR 66 about the client content request (S70). The routing request may include a bypass ratio and an IP address of the UE 20 requesting the content. The RR 16 may analyze information from the MS 18 (e.g., collected KPI from the DNs 14, latency measurements, bypass ratios from the DNs 14, etc.) and may select a candidate DN 14*b* (e.g., DNe2) to service the client content request, based at least in part on the information from the MS 18, such as the collected KPI and the received bypass ratio, as well as, the IP address of the UE 20. As a result of selecting a candidate DN 14*b*, the RR 16 may return an indication, e.g., the IP address or fully qualified domain name (FQDN) of the selected DN 14*b* (e.g., DNe2) back to the original DN 14*a* (e.g., DNe3) (S72). In one embodiment, the original DN 14*a* (e.g., DNe3) redirects the client content request to the selected DN 14*b* (e.g., DNe2), instead of processing the client content request locally (S74). For example, the original DN 14*a* (e.g., DNe3) may send the requesting UE 20 an address of the selected DN 14*b* (e.g., DNe2) and an indication to resend the client content request to the selected DN 14*b*. The UE 20 may then send the client content request to the selected DN 14*b* (S76).

In one embodiment, the selected DN 14*b* (e.g., DNe2) does not have the requested content in its local cache and therefore requests the content from a DN 14*c* in the next/higher tier/layer (e.g., DNc1) to fetch the content (S78). In one embodiment, the DN 14*c* in the next layer (e.g., DNc1) does not have the content and requests the content from the origin server 22 (S80) since DN 14*c* has not cached the requested content yet. The origin server 22 may return the requested content to the DN 14*c* at the higher layer (e.g., DNc1) (S82). Subsequently, the DN 14*c* at the higher layer may return the requested content to the selected DN 14*b* (e.g., DNe2) (S84). Each DN 14 may cache the requested content according to, for example, caching validation policies. The selected DN 14*b* (e.g., DNe2) may cache the requested content and send the response with the content to the UE 20 (S86). In some embodiments, the selected DN 14*b* may continue to service caching and content delivery to the UE 20 (instead of the original DN 14*a*) until, for example, the selected DN 14*b* enters into a bypass mode and/or the original DN 14*a* (which may be closer to the UE 20) exits bypass mode, returning to a normal caching mode.

In some embodiments, for non-ABR content delivery, such as progressing download, embodiments of the present disclosure may offload the traffic between same-layer DNs 14*a*, 14*b* (e.g., DNe3 to DNe2) relatively efficiently. However, for ABR content delivery (e.g., streaming), there may arise an issue with handling subsequent segment files for the same content if the request for a segment file is identified for bypass by the original DN 14*a* (e.g., DNe3). For example, the UE 20 may communicate the request for a subsequent segment file to the original DN 14*a* (e.g., DNe3) again, instead of continuing to send the segment file requests to the selected DN 14*b* (e.g., DNe2). This may be due to a client application implementation on the UE 20 for handling the manifest file, in which all the segment files may be requested through the corresponding URLs. The client application associated with the UE 20 may continue to follow the original URL instead of the redirect URL, which may result in efficiencies due to the continuous redirecting for each subsequent segment file associated with the ABR content delivery (e.g., streaming). Accordingly, in some embodiments, for ABR content delivery, only the manifest requests may be permitted for bypass. For example, the DN 14 (and/or the RR 16) may not consider or select for bypass client content requests that are segment file requests. However, the request for the manifest files may be considered and/or selected for bypass and thereby redirected to another DN 14*b* (e.g., DNe2). In such embodiments, once the manifest file request is redirected to DN 14*b*, the UE 20 may continue to send requests to the redirected DN 14*b* (e.g., DNe2) to receive the content corresponding to the subsequent sequential segment files associated with the requested content, which may be indicated in the manifest file of the requested content (e.g., streaming content).

Some embodiments of the present disclosure may provide a CDN operator with the advantage of utilizing caching and delivery servers (e.g., DNs 14) more efficiently. In addition, content providers may have an advantage of reducing the risk of experiencing traffic overload conditions at its origin servers 22. Other benefits of some embodiments of the present disclosure may include faster response times from the caching server (DN 14) and enhanced user experience due to such faster response times (reduced latency).

Figure 11:
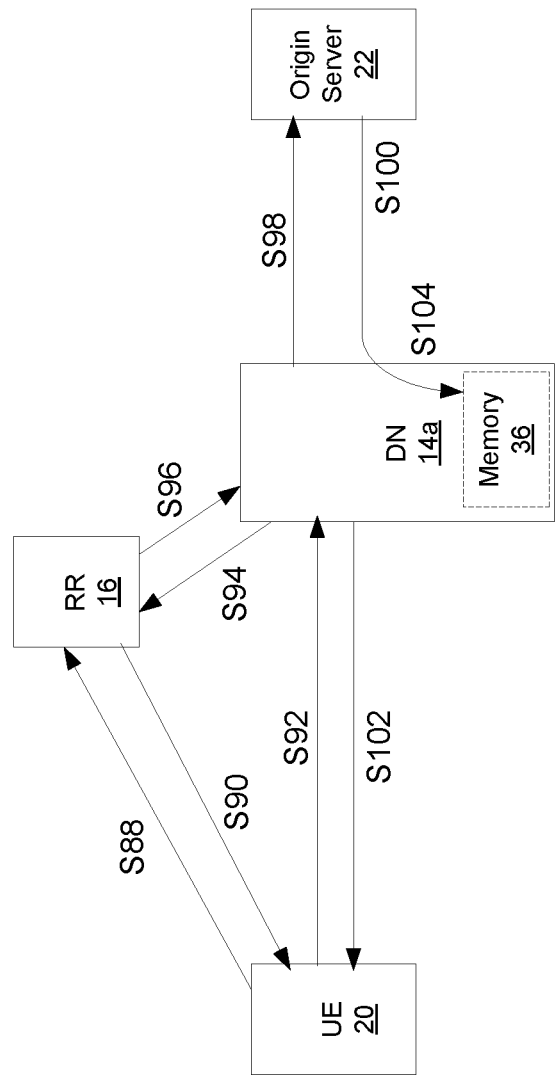
FIG. 11 is a flow diagram for an exemplary scenario with normal traffic flow without I/O protection.
Figure 12:
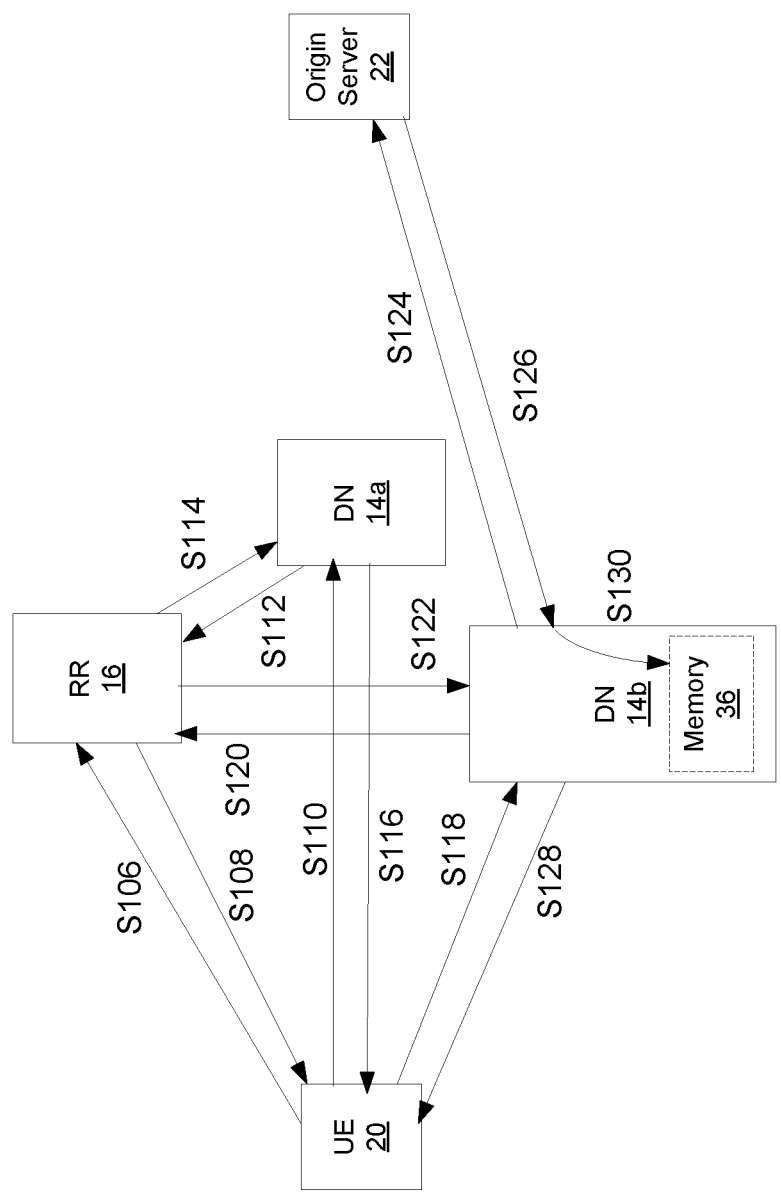
FIG. 12 is a flow diagram for another exemplary scenario with traffic flow for bypass mode, according to one embodiment of the present disclosure.
Figure 13:
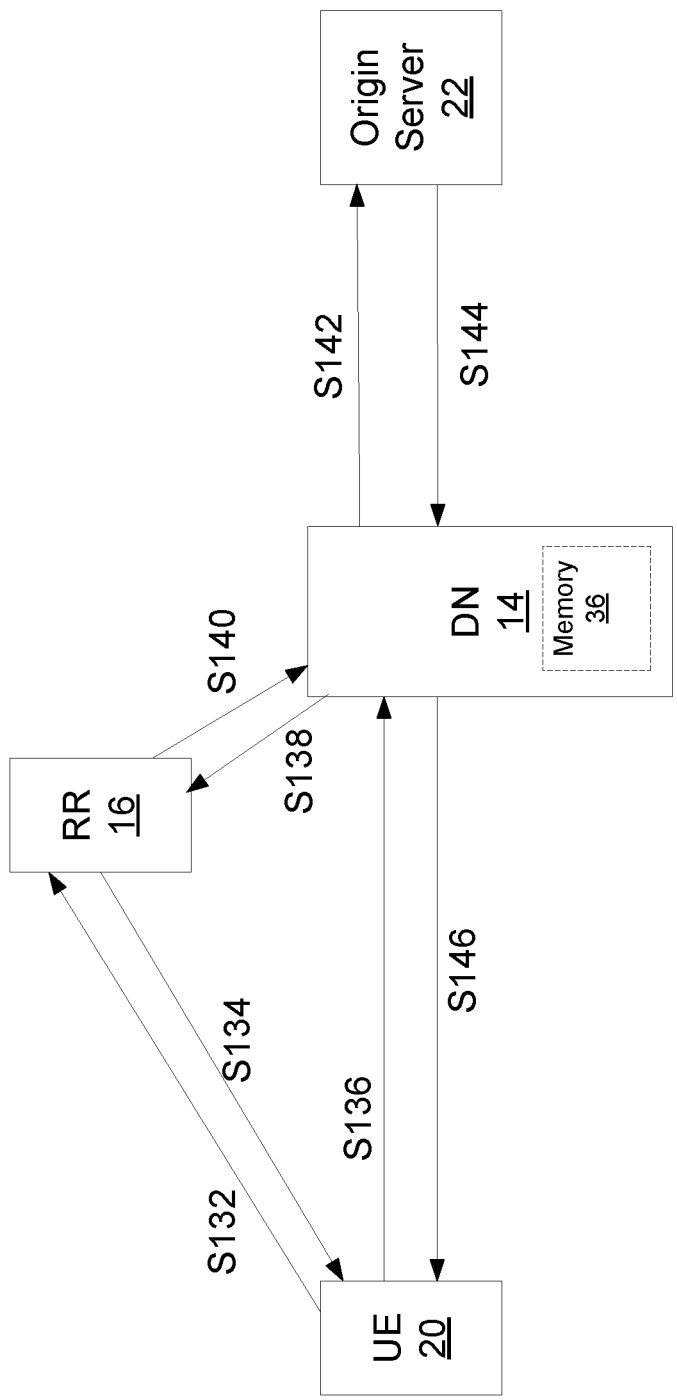
FIG. 13 is a flow diagram for yet another exemplary scenario with traffic flow for bypass mode exceeding a CDN threshold capacity, according to one embodiment of the present disclosure.

Referring now primarily to FIGS. 11-13, three example scenarios of traffic flow associated with delivering content via the CDN 12 are described according to embodiments of the present disclosure. Specifically, FIGS. 11-13 illustrate an exemplary normal traffic flow without bypass I/O protection mode, an exemplary traffic flow with bypass I/O protection mode on at least one DN 14 in the CDN 12, and an exemplary traffic flow with bypass I/O protection mode on a number of DNs 14 in the CDN 12 that exceeds a maximum threshold, respectively.

In the first example scenario, illustrated in FIG. 11, an exemplary normal traffic flow is shown without bypass I/O protection mode. In the example, the UE 20 sends a client content request to the RR 16 (which may be running a request routing service for the CDN 12) in order to identify the caching DN 14 that can deliver the content efficiently (S88). As a result of receiving the client content request, the RR 16 may return an address or other indicator of the caching DN 14 (e.g., 302/307) to the UE 20 (S90). The RR 16 may select the caching DN 14 based on, for example, the requested content (e.g., URL of the content), proximity of the UE 20 to a particular DN 14, and collected KPI. The UE 20 may then fetch the content from the caching DN 14 indicated by the RR 16 by, for example, sending the client content request to the caching DN 14 (S92). As a result of receiving the client content request from the UE 20, the caching DN 14 may forward or otherwise send the client content request to the RR 16 to obtain an indication of the origin server 22 that the DN 14 should obtain the content from (S94). The RR 16 may select the origin server 22 based on, for example, a configuration or KPI associated with the origin server 22 and may send the URL of the selected origin server 22 to the caching DN 14 (S96). The DN 14 send the client content request to the selected origin server 22 to fetch the requested content (S98). As a result of receiving the client content request from the DN 14, the origin server 22 may send the content requested to the DN 14 (S100). As a result of receiving the content from the origin server 22, the DN 14 may, for example, proxy the response (content) to the UE 20 (e.g., forward the content) (S102) and may also store/cache the received content in local storage (e.g., memory 36, which may be, for example, RAM, SSD, HDD, etc.) (S104). Both proxying and caching the content may be performed by the DN 14 substantially simultaneously so that the content can be delivered to the UE 20 as well as cached for future access.

In the second example scenario, illustrated in FIG. 12, an exemplary traffic flow with bypass I/O protection mode on at least one DN 14 in the CDN 12 is shown. In the example, the UE 20 may send a client content request to the RR 16, which may be running a request routing service, to identify the caching DN 14 that can deliver the content efficiently (S106). As a result of receiving the client content request, the RR 16 may return an address or other indicator of the caching DN 14 (e.g., 302/307) to the UE 20 (S108). The RR 16 may select the caching DN 14 (e.g., 14*a*) based on, for example, the requested content (e.g., URL of the content), proximity of the UE 20 to a particular DN 14, and collected KPI. The UE 20 may then fetch the content from the caching DN 14 (e.g., 14*a*) indicated by the RR 16 by, for example, sending the client content request to the caching DN 14*a* (S110). Due to the DN 14*a* being at a high latency (e.g., latency for READ and/or WRITE I/O operations towards local storage being above a latency threshold), the DN 14*a* may trigger a bypass I/O protection mode by, for example, increasing a bypass ratio, e.g. to 20%. The DN 14*a* may select the client content request for bypass and, as a result, the DN 14*a* may send a routing request to the RR 16 (S112) to obtain an indication of another, different DN 14 (e.g., 14*b*) to handle the client content request instead of the current DN 14*a*. The DN 14*a* may also send a notification to the MS 18 to indicate that the status of the DN 14*a* is bypass mode. In some embodiments, this step may be performed at substantially the same time as S112. In some embodiments, the DN 14*a* may select the client content request for bypass for all non-ABR content deliveries and only manifest files (not segment files) for ABR content deliveries. In other embodiments, the DN 14*a* may be configured to select the client content request for bypass based on other or additional factors. The RR 16 may select a DN 14 (e.g., 14*b*) based on, for example, one or more of the collected KPI, the IP address of the UE 20, etc. The RR 16 may then return an indication of the selected DN (e.g., 14*b*) to the current (originally-selected) DN 14*a* (S114). In one embodiment, the current DN 14*a* may redirect the client content request to the selected DN 14*b* by, for example, sending an indication (e.g., IP address) of the selected DN 14*b* to the UE 20 (S116). As a result of being redirected to the selected DN 14*b*, the UE 20 may access the selected DN 14*b* to fetch the content (S118). In one embodiment, the selected DN 14*b* may not have the requested content cached yet; therefore, the selected DN 14*b* may send a routing request to the RR 16 to identify the origin server 22 from which the selected DN 14*b* can obtain the content (S120). The RR 16 may select an origin server 22 based on, for example, a configuration or KPI associated with the origin server 22 and may send the URL of the selected origin server 22 to the selected DN 14*b* (S122). The selected DN 14*b* may then send the content request to the origin server 22 to fetch the requested content (S124). As a result of receiving the client content request from the DN 14*b*, the origin server 22 may send the content requested to the DN 14*b* (S126). In one embodiment, as a result of receiving the content from the origin server 22, the DN 14*b* may, for example, proxy the response (content) to the UE 20 (e.g., forward the content) (S128) and may also store/cache the received content in local storage (e.g., memory 36, which may be, for example, RAM, SSD, HDD, etc.) (S130). Both proxying and caching the content may be performed by the DN 14*b* substantially simultaneously so that the content can be delivered to the UE 20 as well as cached for future access.

In the third example scenario, illustrated in FIG. 13, an exemplary traffic flow with bypass I/O protection mode on a number of DNs 14 in the CDN 12 that exceeds a maximum threshold capacity is shown. In one embodiment, the maximum threshold capacity is that all DNs 14 in the CDN 12 are in a bypass mode (e.g., all DNs 14 have a bypass ratio >0%). In a further embodiment, the maximum threshold is that all DNs 14 in an edge layer of the CDN 12 are in a bypass mode (e.g., all DNs 14 in the edge layer of the CDN 12 have a bypass ratio >0%). In the example, the UE 20 sends a client content request to the RR 16 (which may be running a request routing service for the CDN 12) in order to identify the caching DN 14 that can deliver the content efficiently (S132). As a result of receiving the client content request, the RR 16 may return an address or other indicator of the caching DN 14 (e.g., 302/307) to the UE 20 (S134). The RR 16 may select the caching DN 14 based on, for example, the requested content (e.g., URL of the content), proximity of the UE 20 to a particular DN 14, and collected KPI. The UE 20 may then fetch the content from the caching DN 14 indicated by the RR 16 by, for example, sending the client content request to the caching DN 14 (S136). Due to the DN 14 being at a high latency (e.g., latency for READ and/or WRITE I/O operations towards local storage being above a latency threshold), the DN 14 may trigger a bypass I/O protection mode by, for example, increasing a bypass ratio, e.g. to 20%. The DN 14 may select the client content request for bypass and, as a result, the DN 14 may send a routing request to the RR 16 (S138) to obtain an indication of another, different DN 14 to handle the client content request instead of the current DN 14. The DN 14 may also send a notification to the MS 18 to indicate that the status of the DN 14 is bypass mode. In some embodiments, this step may be performed at substantially the same time as S138. In some embodiments, the DN 14 may select the client content request for bypass for all non-ABR content deliveries and only manifest files (not segment files) for ABR content deliveries. In other embodiments, the DN 14 may be configured to select the client content request for bypass based on other or additional factors. In some embodiments, S132-S138 in the example scenario of FIG. 13 may be identical to or substantially similar to S106-S112 of the example scenario of FIG. 12. The two scenarios may differ in that in FIG. 13, the RR 16 determines that a threshold number of DNs 14 are in bypass mode, which at least meets a maximum threshold or capacity of the CDN 12 (whereas in FIG. 12 the maximum capacity has not been at least met).

Continuing with the flow of FIG. 13, as a result of receiving the routing request from the DN 14, the RR 16 may determine that at least a threshold number of DNs 14 of the CDN 12 are in bypass mode (e.g., bypass ratio >0%). Accordingly, the RR 16 may send a routing request response message to the DN 14 that does not identify another DN 14 (S140). The RR 16 may also send or set an alarm for the MS 18 to notify, for example, an operator of the CDN 12, that current traffic volume for the CDN 12 has at least met a maximum design threshold for the CDN 12. Having not received an identification of a different DN 14 from the RR 16 to handle the client request, the current DN 14 may allow the client content request to bypass towards the origin server 22 by, for example, sending the content request to the origin server 22 (S142). In one embodiment, the DN 14 may send the content request to the origin server 22 without accessing the content from its local cache (e.g., memory 36). Instead, in some embodiments, the DN 14 may obtain the URL of the origin server 22 from its local cache (assuming that is that the origin server's 22 URL is already cached locally from previous routing request towards the RR 16) and may then forward the content request to the origin server 22. The origin server 22 may send the response (content) to the DN 14 (S144). The DN 14 may receive the requested content from the origin server 22 and may proxy the content to the UE 20 directly, without performing a READ or WRITE operation for the content in local cache. Even if the DN 14 has the content already cached in local storage, the DN 14 may proxy the content to the UE 20, instead of accessing the cached content, in order to reduce the processing load of the DN 14 since the DN 14 is in bypass mode.

In some embodiments, the RR 16 may determine dynamically or statically a routing configuration of a routing path between DNs 14 in different layers where the RR 16 has determined that the content request should be proxied to a higher layer. In one embodiment, the hashing algorithm for determining a routing path may be, for example, a rendezvous hashing, consistent hashing, or other algorithm, etc., such as another content based request routing. Static routing configurations may be, for example, predetermined routing configurations stored in a memory.

Some embodiments of the present disclosure may advantageously reduce traffic leakage towards up-tier DNs 14 and the origin server 22 due to, for example, allowing the RR 16 to selectively redirect client content requests to other edge DNs 14. Such embodiments may reduce the risk of origin servers 22 being overloaded due to the bypass mode of DNs 14 in the CDN 12.

Abbreviations that may be used in the preceding description include:

| Abbreviations | Explanation |
| --- | --- |
| ABR | Adaptive Bit Rate |
| CDN | Content Delivery Network |
| KPI | Key Performance Index |
| MS | Monitoring Service |
| RRS | Request Routing Service |
| DB | Database |
| DN | Delivery Node |

As will be appreciated by one of skill in the art, the concepts described herein may be embodied as a method, data processing system, and/or computer program product. Accordingly, the concepts described herein may take the form of an entirely hardware embodiment, an entirely software embodiment or an embodiment combining software and hardware aspects all generally referred to herein as a "circuit" or "module." Furthermore, the disclosure may take the form of a computer program product on a tangible computer usable storage medium having computer program code embodied in the medium that can be executed by a computer. Any suitable tangible computer readable medium may be utilized including hard disks, CD-ROMs, electronic storage devices, optical storage devices, or magnetic storage devices.

Some embodiments are described herein with reference to flowchart illustrations and/or block diagrams of methods, systems and computer program products. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer (to thereby create a special purpose computer), special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable memory or storage medium that can direct a computer or other programmable data processing apparatus to function in a particular manner, such that the instructions stored in the computer readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks. It is to be understood that the functions/acts noted in the blocks may occur out of the order noted in the operational illustrations. For example, two blocks shown in succession may in fact be executed substantially concurrently or the blocks may sometimes be executed in the reverse order, depending upon the functionality/acts involved. Although some of the diagrams include arrows on communication paths to show a primary direction of communication, it is to be understood that communication may occur in the opposite direction to the depicted arrows.

Computer program code for carrying out operations of the concepts described herein may be written in an object oriented programming language such as Java® or C++. However, the computer program code for carrying out operations of the disclosure may also be written in conventional procedural programming languages, such as the "C" programming language. The program code may execute entirely on the user's computer, partly on the user's computer, as a stand-alone software package, partly on the user's computer and partly on a remote computer or entirely on the remote computer. In the latter scenario, the remote computer may be connected to the user's computer through a local area network (LAN) or a wide area network (WAN), or the connection may be made to an external computer (for example, through the Internet using an Internet Service Provider).

Many different embodiments have been disclosed herein, in connection with the above description and the drawings. It will be understood that it would be unduly repetitious and obfuscating to literally describe and illustrate every combination and subcombination of these embodiments. Accordingly, all embodiments can be combined in any way and/or combination, and the present specification, including the drawings, shall be construed to constitute a complete written description of all combinations and subcombinations of the embodiments described herein, and of the manner and process of making and using them, and shall support claims to any such combination or subcombination.

It will be appreciated by persons skilled in the art that the embodiments described herein are not limited to what has been particularly shown and described herein above. In addition, unless mention was made above to the contrary, it should be noted that all of the accompanying drawings are not to scale. A variety of modifications and variations are possible in light of the above teachings without departing from the scope of the following claims.

What is claimed is:

1. A request router for a multi-tier Content Delivery Network, CDN, each tier corresponding to a hierarchical layer of the CDN, the request router comprising processing circuitry configured to:
   receive, from a first delivery node of a hierarchical layer of the CDN, a routing request to bypass the first delivery node for content delivery to a user equipment; and
   as a result of receiving the routing request to bypass the first delivery node for the content delivery to the user equipment, select at least a second delivery node for the content delivery to the user equipment,
   wherein the processing circuitry is further configured to select the second delivery node for the content delivery to the user equipment from one of a same hierarchical layer of the CDN as the hierarchical layer of the first delivery node and a higher hierarchical layer than the hierarchical layer of the first delivery node, the selection being dependent on at least a number of delivery nodes in the CDN that are determined to be in a bypass mode,
   wherein, for adaptive bit rate, ABR, content requests, only manifest requests are permitted to bypass the first delivery node for the selected at least the second delivery node and wherein, for ABR content requests, segment file requests are not permitted to bypass the first delivery node for the selected at least the second delivery node.

2. The request router according to claim 1, wherein the hierarchical layer of the CDN is an edge layer of the CDN and the higher hierarchical layer is one of a region layer and a core layer of the CDN.

3. The request router according to claim 1, wherein the processing circuitry is further configured to select the at least the second delivery node for the content delivery to the user equipment by being further configured to:
   select the at least the second delivery node from a same hierarchical layer of the CDN as the hierarchical layer of the first delivery node unless a number of delivery nodes that are determined to be in a bypass mode at least meets a threshold number of delivery nodes; and
   if the number of delivery nodes that are in the bypass mode at least meets the threshold number of delivery nodes, select the at least the second delivery node from one of an origin server and a delivery node in a higher hierarchical layer of the CDN than the hierarchical layer of the first delivery node.

4. The request router according to claim 1, wherein the processing circuitry is further configured to, if the selected at least the second delivery node is in a same hierarchical layer of the CDN as the hierarchical layer of the first delivery node, communicate, to the first delivery node, an indication to redirect a content delivery request from the user equipment to the at least the second delivery node in the same hierarchical layer of the CDN.

5. The request router according to claim 4, wherein the indication to redirect the content delivery request includes at least an address of the at least the second delivery node to which the user equipment is to be redirected.

6. The request router according to claim 1, wherein the processing circuitry is further configured to, if the selected at least the second delivery node is not in a same hierarchical layer of the CDN as the hierarchical layer of the first delivery node, communicate, to the first delivery node, an indication to, instead of accessing local cache, proxy a content delivery request for one of an origin server and a delivery node in a higher hierarchical layer of the CDN than the hierarchical layer of the first delivery node.

7. The request router according to claim 6, wherein the indication to proxy the content delivery request includes an indication to proxy the content request using Hypertext Transfer Protocol.

8. The request router according to claim 1, wherein, for ABR content requests, segment file requests are not permitted to bypass the first delivery node for the selected at least the second delivery node.

9. The request router according to claim 1, wherein the processing circuitry is configured to receive, from the first delivery node, the routing request to bypass the first delivery node by receiving the routing request comprising at least a bypass ratio and an Internet Protocol, IP, address of the user equipment, wherein the bypass ratio is a ratio of a number of content delivery requests that should bypass the first delivery node to a total number of content delivery requests assigned to the first delivery node and wherein the bypass ratio is determined based on at least a processing load of the first delivery node.

10. The request router according to claim 1, wherein the processing circuitry is further configured to select the at least the second delivery node based on at least a bypass ratio and an Internet Protocol (IP) address of the user equipment.

11. The request router according to claim 1, wherein the processing circuitry is further configured to select the at least the second delivery node based on at least a key performance indicator of the at least the second delivery node.

12. The request router according to claim 1, wherein the processing circuitry is further configured to:
   determine a number of delivery nodes that are in a bypass mode; and as a result of determining that the number of delivery nodes that are in the bypass mode at least meets a threshold, communicate, to a Monitoring Service, an indication that current traffic volume at least meets a threshold capacity of the CDN.

13. The request router according to claim 1, wherein the processing circuitry is further configured to:
   determine whether to proxy a content delivery request to the at least the second delivery node in a higher hierarchical layer of the CDN than the hierarchical layer of the first delivery node; and
   if the content delivery request is determined to be proxied to the at least the second delivery node in the higher hierarchical layer of the CDN, one of:
   statically determine a routing path between the first delivery node in the hierarchical layer and the at least the second delivery node in the higher hierarchical layer; and dynamically determine, via a hashing algorithm, a routing path between the first delivery node in the hierarchical layer and the at least the second delivery node in the higher hierarchical layer.

14. A first delivery node of a multi-tier Content Delivery Network, CDN, each tier corresponding to a hierarchical layer of the CDN, the first delivery node comprising processing circuitry configured to:
  communicate, to a request router, a routing request to bypass the first delivery node for content delivery to a user equipment, the first delivery node being in a hierarchical layer of the CDN; and
  receive an indication of at least a second delivery node for the content delivery to the user equipment, as a result of the routing request to bypass the first delivery node,
  wherein the at least the second delivery node is in one of a same hierarchical layer of the CDN as the hierarchical layer of the first delivery node and a higher hierarchical layer than the hierarchical layer of the first delivery node depending on at least a number of delivery nodes in the CDN that are determined to be in a bypass mode
  wherein, for adaptive bit rate, ABR, content requests, only manifest requests are permitted to bypass the first delivery node for the at least the second delivery node and wherein, for ABR content requests, segment file requests are not permitted to bypass the first delivery node for the at least the second delivery node.

15. A method for a request router for a multi-tier Content Delivery Network, CDN, each tier corresponding to a hierarchical layer of the CDN, the method comprising:
  receiving, from a first delivery node of a hierarchical layer of the CDN, a routing request to bypass the first delivery node for content delivery to a user equipment; and
  as a result of receiving the routing request to bypass the first delivery node for the content delivery to the user equipment, selecting at least a second delivery node for the content delivery to the user equipment,
  wherein the processing circuitry is further configured to select the second delivery node for the content delivery to the user equipment from one of a same hierarchical layer of the CDN as the hierarchical layer of the first delivery node and a higher hierarchical layer than the hierarchical layer of the first delivery node, the selection being dependent on at least a number of delivery nodes in the CDN that are determined to be in a bypass mode,
  wherein, for adaptive bit rate, ABR, content requests, only manifest requests are permitted to bypass the first delivery node for the selected at least the second delivery node and wherein, for ABR content requests, segment file requests are not permitted to bypass the first delivery node for the selected at least the second delivery node.

16. A method for a first delivery node of a multi-tier Content Delivery Network, CDN, each tier corresponding to a hierarchical layer of the CDN, the method comprising:
  communicating, to a request router, a routing request to bypass the first delivery node for content delivery to a user equipment, the first delivery node being in a hierarchical layer of the CDN; and
  receiving an indication of at least a second delivery node for the content delivery to the user equipment, as a result of the routing request to bypass the first delivery node,
  wherein the at least the second delivery node is in one of a same hierarchical layer of the CDN as the hierarchical layer of the first delivery node and a higher hierarchical layer than the hierarchical layer of the first delivery node depending on at least a number of delivery nodes in the CDN that are determined to be in a bypass mode,
  wherein, for adaptive bit rate, ABR, content requests, only manifest requests are permitted to bypass the first delivery node for the at least the second delivery node and wherein, for ABR content requests, segment file requests are not permitted to bypass the first delivery node for the at least the second delivery node.

* * * * *